United States Patent
Yamamoto et al.

(10) Patent No.: US 11,386,565 B2
(45) Date of Patent: Jul. 12, 2022

(54) SIGNAL PROCESSING APPARATUS AND SIGNAL PROCESSING METHOD, PROGRAM, AND MOVING BODY

(71) Applicant: Sony Corporation, Tokyo (JP)

(72) Inventors: Keitaro Yamamoto, Tokyo (JP); Shinichiro Abe, Kanagawa (JP); Masahiko Toyoshi, Tokyo (JP); Shun Lee, Saitama (JP)

(73) Assignee: SONY CORPORATION, Tokyo (JP)

( * ) Notice: Subject to any disclaimer, the term of this patent is extended or adjusted under 35 U.S.C. 154(b) by 188 days.

(21) Appl. No.: 16/644,164

(22) PCT Filed: Aug. 28, 2018

(86) PCT No.: PCT/JP2018/031660
§ 371 (c)(1),
(2) Date: Mar. 4, 2020

(87) PCT Pub. No.: WO2019/049710
PCT Pub. Date: Mar. 14, 2019

(65) Prior Publication Data
US 2021/0065387 A1 Mar. 4, 2021

(30) Foreign Application Priority Data
Sep. 11, 2017 (JP) .............................. JP2017-173962

(51) Int. Cl.
*G02B 6/42* (2006.01)
*G06T 7/33* (2017.01)
(Continued)

(52) U.S. Cl.
CPC ............ *G06T 7/33* (2017.01); *G02B 6/29311* (2013.01); *G02B 6/4246* (2013.01); *G06T 7/70* (2017.01);
(Continued)

(58) Field of Classification Search
CPC .. G02B 6/29311; G02B 6/4246; G01C 21/28; G06T 1/00; G06T 2207/10016;
(Continued)

(56) References Cited

U.S. PATENT DOCUMENTS 8,704,889 B2 * 4/2014 Hofman ................. G06K 9/209
348/143
2010/0289632 A1 * 11/2010 Seder ..................... G02B 27/01
340/436
(Continued)

FOREIGN PATENT DOCUMENTS

JP 2005-043247 A 2/2005
JP 2008-037361 A 2/2008
(Continued)

OTHER PUBLICATIONS

International Search Report and Written Opinion dated Nov. 27, 2018 for PCT/JP2018/031660 filed on Aug. 28, 2018, 9 pages including English Translation of the International Search Report.

*Primary Examiner* — Ian L Lemieux
(74) *Attorney, Agent, or Firm* — Xsensus, LLP

(57) ABSTRACT

The present disclosure relates to a signal processing apparatus and a signal processing method, a program, and a moving body that allow improvement of estimation accuracy for a self-position.

One of a plurality of wavelengths of light is selected, and the light with the selected wavelength is projected. Reflected light of the projected light is received that is reflected from a reflector corresponding to an object having a reflectance higher than a predetermined reflectance, and the reflector is detected. This prevents interference of light projected by another vehicle, enabling appropriate detection of the reflec-
(Continued)

tor and improvement of estimation accuracy for a self-position. The present disclosure is applicable to an in-vehicle system.

14 Claims, 14 Drawing Sheets

(51) Int. Cl.
*G06T 7/70* (2017.01)
*G02B 6/293* (2006.01)

(52) U.S. Cl.
CPC .............. *G06T 2207/10016* (2013.01); *G06T 2207/30252* (2013.01)

(58) Field of Classification Search
CPC . G06T 2207/30252; G06T 7/246; G06T 7/33; G06T 7/70; G08G 1/16
See application file for complete search history.

(56) References Cited

U.S. PATENT DOCUMENTS

| 2014/0112537 | A1* | 4/2014 | Frank | G01V 8/10 |
| | | | | 382/103 |
| 2017/0234976 | A1* | 8/2017 | Grauer | G01S 17/89 |
| | | | | 356/5.04 |
| 2018/0157925 | A1* | 6/2018 | Zeviar | G06K 9/2036 |

FOREIGN PATENT DOCUMENTS

| JP | 2008-234521 A | 10/2008 | |
| JP | 2010-164521 A | 7/2010 | |
| JP | 2016-095258 A | 5/2016 | |
| JP | 2016-197046 A | 11/2016 | |
| JP | 2017-111006 A | 6/2017 | |
| WO | 2012/172870 A1 | 12/2012 | |
| WO | WO-2018127789 A1 * | 7/2018 | .......... G01S 7/4815 |

* cited by examiner

SIGNAL PROCESSING APPARATUS AND SIGNAL PROCESSING METHOD, PROGRAM, AND MOVING BODY

CROSS-REFERENCE TO RELATED APPLICATIONS

The present application is based on PCT filing PCT/JP2018/031660, filed Aug. 28, 2018, which claims priority to JP 2017-173962, filed Sep. 11, 2017, the entire contents of each are incorporated herein by reference.

TECHNICAL FIELD

The present disclosure relates to a signal processing apparatus and a signal processing method, a program, and a moving body, and in particular to a signal processing apparatus and a signal processing method, a program, and a moving body that enable a self-position to be highly accurately estimated.

BACKGROUND ART

For realization of automatic driving, a technique has been proposed that involves recognizing the status of surroundings of a subject vehicle to estimate a self-position.

For example, a technique has been proposed that involves calculating a distance to an object on a basis of temporal changes in feature points or an image obtained using an edge light projector to create an environment map (see PTL 1).

Additionally, a technique has been proposed that involves using a light projector having periodically varying brightness to extract reflected light synchronizing with a variation in the brightness of the light projector, thus detecting a group of reflecting objects to recognize the surroundings to estimate the self-position (see PTL 2).

CITATION LIST

Patent Literature

[PTL 1]
  WO 2012/172870
[PTL 2]
  JP 2016-197046 A

SUMMARY

Technical Problem

However, in a case where feature points are extracted from an image as in PTL 1, extraction accuracy for the feature points decreases at dark night, possibly leading to reduced estimation accuracy for the self-position.

Additionally, in the technique in PTL 1, in a case where the image contains a high-brightness saturated pixel area corresponding to reflectors or direct viewing of a light source, such an area may reduce the accuracy of extraction of the feature points.

Furthermore, in PTL 2, in a case where opposing vehicles use the same system, direct light from the light projectors of both vehicles may cause misdetection.

In view of these circumstances, a particular object of the present disclosure is particularly to improve the estimation accuracy for the self-position.

Solution to Problem

A signal processing apparatus according to an aspect of the present disclosure is a signal processing apparatus including a light projecting section projecting light with a plurality of wavelengths, and an object detecting section receiving reflected light of the light projected from the light projecting section, from an object having a reflectance higher than a predetermined reflectance, to detect the object.

The signal processing apparatus can further include a light projection adjusting section selecting one of the plurality of wavelengths of the light, causing the light projecting section to project the light with the selected wavelength, and causing the object detecting section to receive reflected light of the light with the selected wavelength to detect the object, the reflected light being obtained from the object.

The light projecting section can include a light source emitting light and a light projecting filter wheel including a plurality of filters arranged in a wheel shape to transmit light with respective predetermined wavelengths included in the light emitted by the light source. The light projection adjusting section can be caused to adjust the light projection filter wheel to transmit light with the selected wavelength included in the light emitted by the light source.

The light projecting section can include LEDs emitting light with a plurality of wavelengths, and the light projection adjusting section can be caused to adjust the LEDs such that at least one of the LEDs that emits the light with the selected wavelength emits light.

The object detecting section can include a light receiving filter wheel including a plurality of filters arranged in a wheel shape to transmit light with respective predetermined wavelengths, and an imaging section imaging light transmitted through one of the filters of the light receiving filter wheel. The light projection adjusting section can be caused to adjust the light receiving filter wheel to allow the imaging section to image the light with the selected wavelength.

The object detecting section can include a plurality of light receiving elements arranged in an array shape and preceded by BPFs (Band Pass Filters) transmitting light with respective predetermined wavelengths, and the light projection adjusting section can be caused to adjust the light receiving elements such that the light receiving element preceded by the BPF transmitting the light with the selected wavelength is allowed to detect the object.

The light projection adjusting section can be caused to transmit, to another signal processing apparatus, information related to a use wavelength candidate corresponding to a candidate for the wavelength used for the light projected by the light projecting section, and to receive information related to a use wavelength candidate for the another signal processing apparatus and transmitted by the another signal processing apparatus, and in a case where the use wavelength candidate for the signal processing apparatus in the subject vehicle matches the use wavelength candidate for the another signal processing apparatus, the light projection adjusting section can be caused to cause the light projecting section to make project light with a wavelength resulting from a change in the use wavelength candidate for the subject vehicle.

The light projection adjusting section can be caused to transmit, to the another signal processing apparatus, an identifier of the signal processing apparatus of the subject vehicle, along with the information related to the use wavelength candidate corresponding to the candidate for the wavelength used for the light projected by the light projecting section, and to receive an identifier of the another signal processing apparatus along with the information related to the use wavelength candidate for the another signal processing apparatus, and in a case where the use wavelength candidate for the signal processing apparatus of the subject vehicle matches the use wavelength candidate for the another signal processing apparatus, the light projection adjusting section can be caused to cause the light projecting section to project light with a wavelength resulting from a change in the use wavelength candidate for the signal processing apparatus of the subject vehicle on a basis of a magnitude relationship between the identifier of the signal processing apparatus of the subject vehicle and the identifier of the another signal processing apparatus.

The identifiers can be serial numbers.

In a case where the light projection adjusting section does not receive, from the another signal processing apparatus, information related to the use wavelength candidate for the another signal processing apparatus, the light projecting section can be caused to project light with a wavelength corresponding to the use wavelength candidates for the light projecting section of the subject vehicle.

The object may include a reflector, a mirror, a road sign, or a road centerline.

The wavelength of the light projected by the light projecting section can be set in a near infrared light band.

The light projecting section can be caused to project and put out light with a plurality of wavelengths at predetermined intervals.

A signal processing method according to an aspect of the present disclosure is a signal processing method including light projecting processing of projecting light with a plurality of wavelengths, and object detecting processing of receiving reflected light of the light projected in the light projecting process, from an object having a reflectance higher than a predetermined reflectance, to detect the object.

A program according to an aspect of the present disclosure is a program causing a computer to execute processing including a light projecting section projecting light with a plurality of wavelengths, and an object detecting section receiving reflected light of the light projected from the light projecting section, from an object having a reflectance higher than a predetermined reflectance, to detect the object.

A moving body according to an aspect of the present disclosure is a moving body including a light projecting section projecting light with a plurality of wavelengths, an object detecting section receiving reflected light of the light projected from the light projecting section, from an object having a reflectance higher than a predetermined reflectance, to detect the object, a status analyzing section analyzing a status on a basis of detection results from the status analyzing section, a scheduling section generating a behavior schedule on a basis of analysis results from the status analyzing section, and an action control section controlling an action on a basis of the behavior schedule.

According to an aspect of the present disclosure, the light with the plurality of wavelengths is projected, and the reflected light of the light projected from the light projecting section is received from the object having a reflectance higher than the predetermined reflectance, to detect the object.

Advantageous Effect of Invention

According to an aspect of the present disclosure, in particular, the estimation accuracy for the self-position can be improved.

DESCRIPTION OF EMBODIMENTS

A preferred embodiment of the present disclosure will be described below in detail with reference to the attached drawings. Note that, in the specification and the drawings, components having substantially the same functions and configurations are denoted by the same reference signs, and overlapping descriptions of the components are omitted.

The embodiment of the present technique will be described below. The description will be made in the following order.

1. Preferred Embodiment of Present Disclosure
2. Modified Example
3. Example of Processing Executed by Software 1. Preferred Embodiment of Present Disclosure <Configuration Example of Vehicle Control System According to Present Disclosure>

A moving body according to the present disclosure is a moving body highly accurately detecting surrounding reflectors and recognizing the orientation of the subject vehicle (self-position and self-direction). The following description relates to an example in which the moving body according to the present disclosure is a vehicle. However, any moving body other than vehicles may be used.

Figure 1:
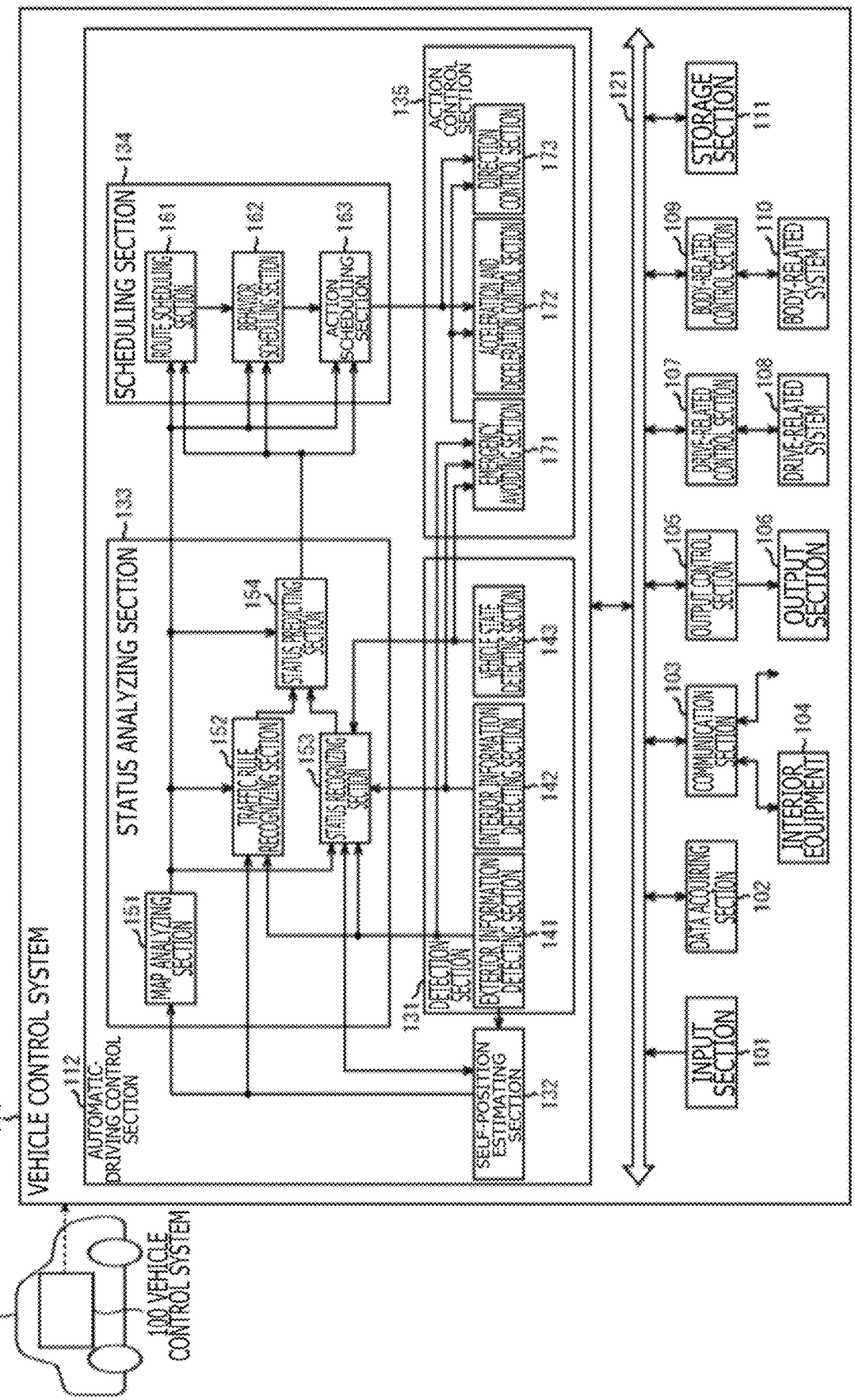
FIG. 1 is a block diagram illustrating a configuration example of a moving body control system controlling a moving body according to the present disclosure.

FIG. 1 is a block diagram illustrating a configuration example of general functions of a vehicle control system 100 mounted in a vehicle 11; the vehicle control system 100 is an example of a moving body control system to which the present technique may be applied.

Note that the vehicle 11 provided with the vehicle control system 100 is hereinafter referred to as a subject vehicle in a case where the vehicle 11 is distinguished from other vehicles.

The vehicle control system 100 includes an input section 101, a data acquiring section 102, a communication section 103, interior equipment 104, an output control section 105, an output section 106, a drive-related control section 107, a drive-related system 108, a body-related control section 109, a body-related system 110, a storage section 111, and an automatic-driving control section 112. The following are connected together via a communication network 121: the input section 101, the data acquiring section 102, the communication section 103, the output control section 105, the drive-related control section 107, the body-related control section 109, the storage section 111, and the automatic-driving control section 112. The communication network 121 includes, an in-vehicle communication network, a bus, or the like in compliance with optional standards, for example, a CAN (Controller Area Network), a LIN (Local Interconnect Network), a LAN (Local Area Network), or FlexRay (registered trademark). Note that the sections of the vehicle control system 100 may be directly connected together without the communication network 121.

Note that, in a case where the sections of the vehicle control system 100 communicate with one another via the communication network 121, the description of the communication network 121 is omitted. For example, in a case where the input section 101 and the automatic-driving control section 112 communicate with each other via the communication network 121, this is simply described as the input section 101 and the automatic-driving control section 112 communicating with each other.

The input section 101 includes apparatuses used by an occupant to input various types of data, instructions, and the like. For example, the input section 101 includes operation devices such as a touch panel, buttons, a microphone, switches, and a lever, and operation devices, and the like enabling input by methods other than manual operation, such as voice and gestures. Additionally, for example, the input section 101 may be a remote control apparatus utilizing infrared rays or other radio waves, or mobile equipment supporting the operation of the vehicle control system 100 or external connection equipment such as wearable equipment. The input section 101 generates an input signal on a basis of data, an instruction, and the like input by the occupant and supplies the signal to relevant sections of the vehicle control system 100.

The data acquiring section 102 includes various sensors and the like acquiring data used for processing of the vehicle control system 100, and supplies acquired data to relevant sections of the vehicle control system 100.

For example, the data acquiring section 102 includes various sensors for detecting the state and the like of the subject vehicle. Specifically, for example, the data acquiring section 102 includes a gyro sensor, an acceleration sensor, an inertial measurement unit (IMU), and sensors or the like for detecting the amount of operation of an accelerator pedal, the amount of operation of a brake pedal, the steering angle of a steering wheel, an engine rotation speed, a motor rotation speed, or the rotation speed of wheels.

Additionally, for example, the data acquiring section 102 includes various sensors for detecting information regarding the exterior of the subject vehicle. Specifically, for example, the data acquiring section 102 includes an imaging apparatus such as a ToF (Time Of Flight) camera, a stereo camera, a monocular camera, an infrared camera, and any other camera. Additionally, for example, the data acquiring section 102 includes an environment sensor for detecting weather or the like, and a surrounding information detecting sensor for detecting objects around the subject vehicle. The environment sensor includes, for example, a raindrop sensor, a fog sensor, sunshine sensor, a snow sensor, and the like. The surrounding information detecting sensor includes, for example, an ultrasonic sensor, a radar, LiDAR (Light Detection ad Ranging, Laser Imaging Detection and Ranging), a sonar, and the like.

Furthermore, for example, the data acquiring section 102 includes various sensors for detecting the current position of the subject vehicle. Specifically, the data acquiring section 102 includes, for example, a GNSS receiver receiving GNSS signals from a GNSS (Global Navigation Satellite System) satellite, and the like.

Additionally, for example, the data acquiring section 102 includes various sensors for detecting interior information. Specifically, the data acquiring section 102 includes, for example, an imaging apparatus imaging a driver, a biosensor detecting biological information regarding the driver, and a microphone and the like collecting sound in the vehicle. The biological sensor is, for example, provided in a seat surface, the steering wheel, or the like to detect biological information regarding the occupant in the seat or the driver holding the steering wheel.

Figure 2:
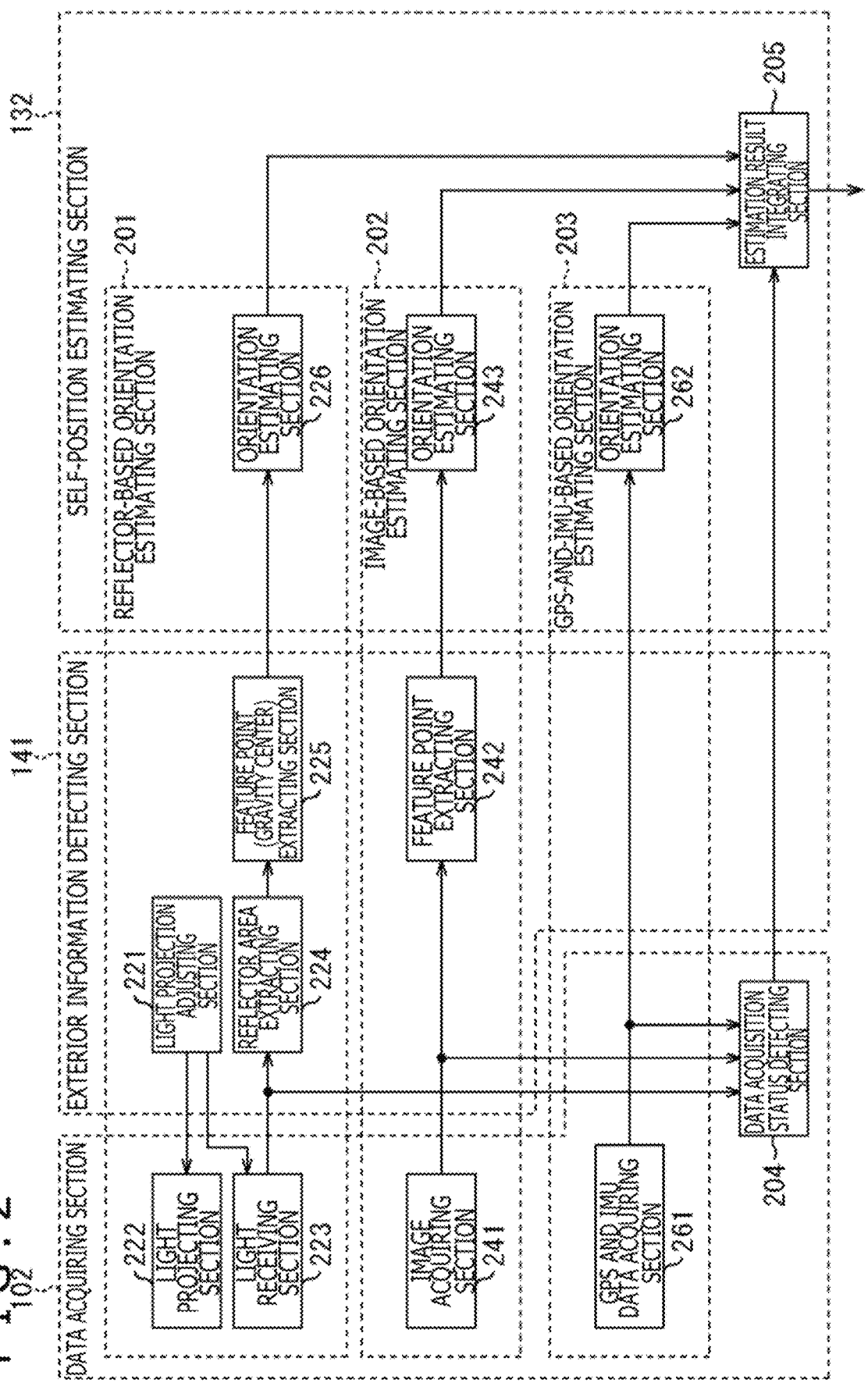
FIG. 2 is a diagram illustrating a configuration that estimates an orientation in a vehicle control system in FIG. 1.

Note that, in the present disclosure, the data acquiring section 102 is also equipped with a light projecting section 222 (FIG. 2) for detecting reflectors, and a light receiving section 223 (FIG. 2). Additionally, a GPS (Global Positioning System) and IMU (Inertial Measurement Unit) data acquiring section 261 (FIG. 2) is mounted that receives GPS (Global Positioning System) signals from a GPS satellite and acquires data from an IMU.

The communication section 103 communicates with the interior equipment 104 and various pieces of exterior equipment, servers, base stations, and the like to transmit data supplied from the relevant sections of the vehicle control system 100 and to supply received data to relevant sections of the vehicle control system 100. Note that a communication protocol supported by the communication section 103 is not particularly limited and additionally that, additionally, the communication section 103 can support a plurality of types of communication protocols.

For example, the communication section 103 wirelessly communicates with the interior equipment 104 through wireless LAN, Bluetooth (registered trademark), NFC (Near Field Communication), WUSB (Wireless USB), or the like. Additionally, the communication section 103 makes wired communication with the interior equipment 104 through, for example, USB (Universal Serial Bus), HDMI (registered trademark) (High-Definition Multimedia Interface), or MHL (Mobile High-Definition Link), or the like via a connection terminal not illustrated (and a cable when necessary).

Furthermore, for example, the communication section 103 communicates with equipment (for example, an application server or a control server) present on an external network (for example, the Internet, a cloud network, or a provider-specific network) via a base station or an access point. Additionally, for example, the communication section 103 uses a P2P (Peer To Peer) technique to communicate with a terminal present near the subject vehicle (for example, a terminal of a pedestrian or in a store, or an MTC (Machine Type Communication) terminal). Furthermore, for example, the communication section 103 makes V2X communication such as vehicle to vehicle communication, vehicle to infrastructure communication, vehicle to home communication, and vehicle to pedestrian communication. Additionally, for example, the communication section 103 includes a beacon receiving section to receive radio waves or electromagnetic waves transmitted from radio stations installed on roads to acquire such information as the current position, congestion, traffic regulations, or required time.

The interior equipment 104 includes, for example, mobile equipment or wearable equipment possessed by the occupant, information equipment loaded or mounted in the subject vehicle, and a navigation apparatus searching for a route to an optional destination.

The output control section 105 controls output of various types of information to the occupant in the subject vehicle or to the exterior. For example, the output control section 105 generates an output signal including at least one of visual information (for example, image data) or audio information (for example, voice data) and supplies the signal to the output section 106 to control output of the visual information and the audio information from the output section 106. Specifically, for example, the output control section 105 synthesizes image data captured by different imaging apparatuses in the data acquiring section 102 to generate a bird's eye image, a panoramic image, or the like, and supplies an output signal including the generated image to the output section 106. Additionally, for example, the output control section 105 generates voice data including a warning sound, a warning message, or the like for danger such as a collision, contact, or entry into a danger zone and supplies an output signal including the generated voice data to the output section 106.

The output section 106 includes an apparatus that can output visual information or audio information to the occupant in the subject vehicle or to the exterior. The output section 106 includes, for example, a display apparatus, an instrument panel, an audio speaker, a headphone, a wearable device such as eyeglass type display worn by the occupant, a projector, and a lamp. Instead of an apparatus including a normal display, the display apparatus provided in the output section 106 may be an apparatus displaying visual information in the field of view of the driver, for example, a head-up display, a transmissive display, or an apparatus including an AR (Augmented Reality) display function.

The drive-related control section 107 generates and supplies various control signals to the drive-related system 108 to control the drive-related system 108. Additionally, the drive-related control section 107 supplies control signals to sections other than the drive-related system 108 as needed, to, for example, notify the sections of a control state of the drive-related system 108.

The drive-related system 108 includes various apparatuses related to a drive system of the subject vehicle. The drive-related system 108 includes, for example, a drive force generating apparatus for generating a drive force for an internal combustion engine or a driving motor, a drive force transmitting mechanism for transmitting a drive force to the wheels, a steering mechanism adjusting the steering angle, a braking apparatus generating a braking force, an ABS (Antilock Brake System), an ESC (Electronic Stability Control), and an electric power steering apparatus.

The body-related control section 109 generates and supplies various control signals to the body-related system 110 to control the body-related system 110. Additionally, the body-related control section 109 supplies control signals to sections other than the body-related system 110 as needed, to, for example, notify the sections of a control state of the body-related system 110.

The body-related system 110 includes various body-related apparatuses installed in a vehicle body. The body-related system 110 includes, for example, a keyless entry system, a smart key system, a power window apparatus, power seats, the steering wheel, an air conditioning apparatus, and various lamps (for example, headlamps, back lamps, brake lamps, blinkers, and fog lamps).

The storage section 111 includes, for example, magnetic storage devices such as a ROM (Read Only Memory), a RAM (Random Access Memory), and HDD (Hard Disc Drive), a semiconductor storage device, an optical storage device, and a magneto-optical storage device. The storage section 111 stores various programs, data, and the like used by the relevant sections of the vehicle control system 100. For example, the storage section 111 stores map data such as three-dimensional high-precision map including a dynamic map, a global map having a lower precision but covering a larger area than the high-precision map, and a local map including information regarding surroundings of the subject vehicle.

The automatic-driving control section 112 performs control related to automatic driving such as autonomous traveling or driving assistance. Specifically, for example, the automatic-driving control section 112 performs cooperative control intended to implement an ADAS (Advanced Driver Assistance System) including collision avoidance or impact relaxation for the subject vehicle, follow-up traveling based on inter-vehicular distances, vehicle speed locked traveling, collision warning for the subject vehicle, or lane departure warning for the subject vehicle. Additionally, the automatic-driving control section 112 performs cooperative control intended for, for example, automatic driving involving autonomous traveling without depending on operation of the driver. The automatic-driving control section 112 includes a detection section 131, a self-position estimating section 132, a status analyzing section 133, a scheduling section 134, and an action control section 135.

The detection section 131 detects various types of information needed to control the automatic driving. The detection section 131 includes an exterior-information detecting section 141, an interior-information detecting section 142, and a vehicle state detecting section 143.

The exterior-information detecting section 141 performs detection processing for information regarding the exterior of the subject vehicle on a basis of data or signals from the relevant sections of the vehicle control system 100. For example, the exterior-information detecting section 141 executes detection processing, recognition processing, and tracking processing for objects around the subject vehicle, and detection processing for distances to the objects. The objects to be detected include, for example, vehicles, human beings, obstacles, structures, roads, traffic signals, traffic signs, and road markings. Additionally, for example, the exterior-information detecting section 141 executes detection processing for environments around the subject vehicle. The surrounding environments to be detected include, for example, weather, temperature, humidity, brightness, and the state of a road surface. The exterior-information detecting section 141 supplies data indicating the results of the detection processing to the self-position estimating section 132, a map analyzing section 151, a traffic rule recognizing section 152, and a status recognizing section 153 of the status analyzing section 133, an emergency avoiding section 171 of the action control section 135, and the like.

The interior-information detecting section 142 executes detection processing for information regarding the vehicle interior on a basis of data or signals from relevant sections of the vehicle control system 100. The interior-information detecting section 142 executes, for example, authentication processing and recognition processing for the driver, detection processing for conditions of the driver, detection processing for occupants, and detection processing for an interior environment. The conditions of the driver to be detected include, for example, a physical condition, the degree of wakefulness, the degree of concentration, the degree of fatigue, and a line-of-sight direction. The interior environments to be detected include, for example, temperature, humidity, brightness, and smell. The interior-information detecting section 142 supplies data indicating the results of the detection processing to the status recognizing section 153 of the status analyzing section 133, the emergency avoiding section 171 of the action control section 135, and the like.

The vehicle state detecting section 143 executes detection processing for the state of the subject vehicle on a basis of data or signals from relevant sections of the vehicle control system 100. The state of the subject vehicle to be detected includes, for example, the speed, an acceleration, the steering angle, the presence and details of an abnormality, the state of driving, the positions and inclinations of the power seats, the state of a door lock, and the state of other in-vehicle equipment. The vehicle state detecting section 143 supplies data indicating the results of the detection processing to the status recognizing section 153 of the status analyzing section 133, the emergency avoiding section 171 of the action control section 135, and the like.

The self-position estimating section 132 executes estimation processing for the position and orientation of the subject vehicle and the like on a basis of relevant sections of the vehicle control system 100 such as the exterior-information detecting section 141 and the status recognizing section 153 of the status analyzing section 133. Additionally, the self-position estimating section 132 generates, as necessary, a local map used to estimate the self-position (hereinafter referred to as a self-position estimation map). The self-position estimation map is, for example, a high-precision map based on a technique such as SLAM (Simultaneous Localization and Mapping). The self-position estimating section 132 supplies data indicating the results of the estimation processing, to the map analyzing section 151, the traffic rule recognizing section 152, and the status recognizing section 153 of the status analyzing section 133, and the like. Additionally, the self-position estimating section 132 causes the storage section 111 to store the self-position estimation map.

The status analyzing section 133 executes analysis processing for the statuses of the subject vehicle and the surroundings. The status analyzing section 133 includes the map analyzing section 151, the traffic rule recognizing section 152, the status recognizing section 153, and a status predicting section 154.

While using, as necessary, data or signals from relevant sections of the vehicle control system 100 such as the self-position estimating section 132 and the exterior-information detecting section 141, the map analyzing section 151 executes analysis processing on various maps stored in the storage section 111 to construct a map including information needed for processing for automatic driving. The map analyzing section 151 supplies the constructed map to the traffic rule recognizing section 152, the status recognizing section 153, the status predicting section 154, and a route scheduling section 161, a behavior scheduling section 162, an action scheduling section 163 in the scheduling section 134, and the like.

The traffic rule recognizing section 152 executes recognition processing for traffic rules for the surroundings of the subject vehicle on a basis of data or signals from relevant sections of the vehicle control system 100 such as the self-position estimating section 132, the exterior-information detecting section 141, and the map analyzing section 151. The recognition processing allows recognition of, for example, the positions and states of signals around the subject vehicle, the contents of traffic regulations around the subject vehicle, and drivable lanes. The traffic rule recognizing section 152 supplies, to the status predicting section 154 and the like, data indicating the results of the recognition processing.

The status recognizing section 153 executes recognition processing for statuses related to the subject vehicle on a basis of data or signals from relevant sections of the vehicle control system 100 such as the self-position estimating section 132, the exterior-information detecting section 141, the interior-information detecting section 142, the vehicle state detecting section 143, and the map analyzing section 151. For example, the status recognizing section 153 executes recognition processing for the status of the subject vehicle, the status of the surroundings of the subject vehicle, and the status of the driver of the subject vehicle. Additionally, the status recognizing section 153 generates, as necessary, a local map needed to recognize the status of surroundings of the subject vehicle (hereinafter referred to as a status recognition map). The status recognition map is, for example, an occupancy grid map.

The status of the subject vehicle to be recognized includes, for example, the position, orientation, and motion (for example, the speed, the acceleration, and the moving direction) of the subject vehicle, and the presence and details of an abnormality. The status of surroundings of the subject vehicle to be recognized includes, for example, the type and position of a stationary object around the subject vehicle, the type, position, and motion (for example, the speed, acceleration, and moving direction) of an animal body around the subject vehicle, the configuration of a road around the subject vehicle and the state of the road surface, and the weather, temperature, humidity, and brightness around the subject vehicle. The conditions of the driver to be recognized include, for example, the physical condition, the degree of wakefulness, the degree of concentration, the degree of fatigue, the motion of the line of sight, and driving.

The status recognizing section 153 supplies, to the self-position estimating section 132, the status predicting section 154, and the like, data indicating the results of the recognition processing (including the status recognition map as necessary). Additionally, the status recognizing section 153 causes the storage section 111 to store the status recognition map.

The status predicting section 154 executes prediction processing for statuses related to the subject vehicle on a basis of data or signals from relevant sections of the vehicle control system 100 such as the map analyzing section 151, the traffic rule recognizing section 152, and the status recognizing section 153. For example, the status predicting section 154 executes prediction processing for the status of the subject vehicle, the status of surroundings of the subject vehicle, the status of the driver, and the like.

The status of the subject vehicle to be predicted includes, for example, behavior of the subject vehicle, occurrence of an abnormality, a drivable distance, and the like. The status of surroundings of the subject vehicle to be predicted includes, for example, the behavior of an animal body around the subject vehicle, a change in the state of a traffic signal, and a change in environment such as weather. The status of the driver to be predicted includes, for example, the behavior and physical condition of the driver.

The status predicting section 154 supplies data indicating the results of the prediction processing, to the route scheduling section 161, the behavior scheduling section 162, and the action scheduling section 163 of the scheduling section 134, and the like, along with the data from the traffic rule recognizing section 152 and the status recognizing section 153.

The route scheduling section 161 schedules a route to a destination on a basis of data or signals from relevant sections of the vehicle control system 100 such as the map analyzing section 151 and the status predicting section 154. For example, the route scheduling section 161 sets a route from the current position to a specified designation on a basis of the global map. Additionally, the route scheduling section 161 appropriately changes the route on a basis of, for example, congestion, accidents, traffic regulations, the status of constructions, and the physical condition of the driver. The route scheduling section 161 supplies data indicating the results of the scheduled route to the behavior scheduling section 162 and the like.

The behavior scheduling section 162 schedules, on a basis of data or signals from relevant sections of the vehicle control system 100 such as the map analyzing section 151 and the status predicting section 154, the behavior of the subject vehicle such that the subject vehicle safely travels, within a scheduled time, along the route scheduled by the route scheduling section 161. The behavior scheduling section 162 schedules, for example, start, stop, a traveling direction (for example, forward, backward, left turn, a right turn, and turnaround), a traveling lane, a traveling speed, and passing. The behavior scheduling section 162 supplies, to the action scheduling section 163 and the like, data indicating the scheduled behavior of the subject vehicle.

The action scheduling section 163 schedules, on a basis of data or signals from relevant sections of the vehicle control system 100 such as the map analyzing section 151 and the status predicting section 154, action of the subject vehicle for implementing the behavior scheduled by the behavior scheduling section 162. The action scheduling section 163 schedules, for example, acceleration, deceleration, and a traveling track. The action scheduling section 163 supplies data indicating the scheduled action of the subject vehicle to an acceleration and deceleration control section 172 and a direction control section 173 of the action scheduling section 163, and the like in the action control section 135.

The action control section 135 controls the action of the subject vehicle. The action control section 135 includes the emergency avoiding section 171, the acceleration and deceleration control section 172, and the direction control section 173.

The emergency avoiding section 171 executes detection processing for emergencies such as a collision, contact, entry into a danger zone, an abnormality in the driver, and an abnormality in the vehicle on a basis of detection results from the exterior-information detecting section 141, the interior-information detecting section 142, and the vehicle state detecting section 143. In a case of detecting an emergency, the emergency avoiding section 171 schedules the action of the subject vehicle such as sudden stop or sudden turning that is taken for avoiding the emergency. The emergency avoiding section 171 supplies, to the acceleration and deceleration control section 172, the direction control section 173, and the like, data indicating the scheduled action of the subject vehicle.

The acceleration and deceleration control section 172 performs acceleration and deceleration control for implementing the action of the subject vehicle scheduled by the action scheduling section 163 or the emergency avoiding section 171. For example, the acceleration and deceleration control section 172 calculates a control target value for a drive force generating apparatus or a braking apparatus for implementing the scheduled acceleration, deceleration, or sudden stop, and supplies, to the drive-related control section 107, a control command indicating the calculated control target value.

The direction control section 173 performs direction control for implementing the action of the subject vehicle scheduled by the action scheduling section 163 or the emergency avoiding section 171. For example, the direction control section 173 calculates a control target value for the steering mechanism for implementing the traveling track or sudden turning scheduled by the action scheduling section 163 or the emergency avoiding section 171 and supplies, to the drive-related control section 107, a control command indicating the calculated control target value.

<Configuration Example in which Orientation of Subject Vehicle is Estimated>

Now, a configuration example in which the vehicle control system 100 in FIG. 1 estimates the orientation of the vehicle control system 100 will be described with reference to FIG. 2.

The configuration example in which the vehicle control system 100 estimates the orientation of the vehicle control system 100 includes the data acquiring section 102 in the vehicle control system 100 and the exterior-information detecting section 141 of the detection section 131 in the automatic-driving control section 112, and the self-position estimating section 132 in FIG. 1.

Additionally, the data acquiring section 102, exterior-information detecting section 141, and the self-position estimating section 132, forming a configuration that estimates the position of the subject vehicle, include a reflector-based orientation estimating section 201, an image-based orientation estimating section 202, a GPS-and-IMU-based orientation estimating section 203, a data acquisition status detecting section 204, and an estimation result integrating section 205.

The reflector-based orientation estimating section 201 projects, into a surrounding area, light with a predetermined wave length in a near infrared light band, captures an image of a range of the light projection, detects, in the captured image, light reflected from the reflectors, and utilizes the positions of the detected reflectors to estimate a self-orientation. The reflector-based orientation estimating section 201 outputs estimation results to an estimation result integrating section 205 as reflector-based orientation estimation results.

Here, the self-orientation is information including the self-position and a self-direction. That is, the self-position is, for example, the position of the subject vehicle on the earth, and the self-direction is, for example, information indicating, when the self-position on the earth is determined, which of the cardinal directions on the earth the subject vehicle faces at the self-position. In the present specification, the self-position and the self-direction are hereinafter collectively referred to as the self-orientation or simply the orientation.

More specifically, the reflector-based orientation estimating section 201 includes a light projection adjusting section 221, a light projecting section 222, a light receiving section 223, a reflector area extracting section 224, a feature point (gravity center) extracting section 225, and an orientation estimating section 226.

To prevent, during communication with another vehicle in a surrounding area, possible misdetection caused by interference resulting from light projected by the light projecting sections 222 of the subject and other vehicles having the same wavelength, the light projection adjusting section 221 adjusts, through the communication with the other vehicle, the wavelength of the light projected by the light projecting section 222 and causes the light projecting section 222 to project light with the adjusted wavelength. More specifically, in a case where a candidate wavelength to be projected from the light projecting section 222 of the another vehicle is the same as the wavelength of light from the subject vehicle, the light projection adjusting section 221 compares, through the communication with the another vehicle in the surrounding area, serial numbers of both light projection adjusting sections 221. Then, the light projection adjusting section 221 with the larger serial number changes the wavelength of the light to be projected, inhibiting interference resulting from projection of light with the same wavelength. Note that the communication with the another vehicle is, for example, inter-vehicle communication utilizing the communication section 103.

The light projecting section 222 projects light with the predetermined wavelength resulting from the adjustment made by the light projection adjusting section 221 such that projection and putting-out of light are repeated at predetermined time intervals. Note that the time intervals during which projection and putting-out of light are repeated are hereinafter each referred to as one frame. Accordingly, in a case where the sum of one projection time and one lights-out time is assumed to be one cycle (one period), the one cycle corresponds to two frames.

While being controlled by the light projection adjusting section 221 and enabled to receive light with the predetermined wavelength adjusted by the light projection adjusting section 221, the light receiving section 223 captures an image during light projection and an image during lights-out for a range within which the light with the predetermined wavelength is projected by the light projecting section 222, and supplies the images to the reflector area extracting section 224.

Note that specific configurations of the light projecting section 222 and the light receiving section 223 will be described below in detail with reference to FIG. 3.

The reflector area extracting section 224 determines a difference image between the image during light projection and the image during lights-out and extracts, as reflector areas, ranges having a brightness value larger than a predetermined value, and supplies the reflector areas to the feature point (gravity center) extracting section 225. Note that, a method for extracting reflector areas will be described below in detail with reference to FIG. 5.

The feature point (gravity center) extracting section 225 extracts gravity center positions of the detected reflector areas as feature points, and supplies information regarding the feature points to the orientation estimating section 226. Note that a method for extracting feature points will be described below in detail with reference to FIG. 6.

On a basis of the information regarding feature point including the gravity center positions of the reflector areas, the orientation estimating section 226 uses, for example, SLAM (Simultaneous Localization And Mapping) to estimate the position of the subject vehicle, and outputs the orientation of the subject vehicle to the estimation result integrating section 205 as reflector-based orientation estimation results.

The image-based orientation estimating section 202 captures an image of the surroundings, utilizes image information corresponding to the imaging results to estimate the self-orientation, and supplies the self-orientation to the estimation result integrating section 205 as image-based orientation estimation results.

More specifically, the image-based orientation estimating section 202 includes an image acquiring section 241, an feature point extracting section 242, and an orientation estimating section 243. The image acquiring section 241 is, for example, an imaging section including an imaging element including a CMOS (Complementary Metal Oxide Semiconductor) image sensor. The image acquiring section 241 captures an image of the surroundings of the vehicle 11, and outputs the captured image to the feature point extracting section 242.

The feature point extracting section 242 extracts, on a basis of the image, feature points including, for example, Harris, SIFT, or SURF corner points, and outputs information regarding the extracted feature points to the orientation estimating section 243.

On a basis of the information regarding the feature points supplied by the feature point extracting section 242, the orientation estimating section 243 uses, for example, SLAM (Simultaneous Localization And Mapping) to estimate the self-orientation, and outputs the self-orientation to the estimation result integrating section 205 as image-based orientation estimation results.

The GPS and IMU-based orientation estimating section 203 utilizes GPS (Global Positioning System) data from a GPS and IMU (Inertial Measurement Unit) data corresponding to measurement results from the IMU to estimate the self-orientation, and outputs the self-orientation to the estimation result integrating section 205 as GPS-and-IMU-based orientation estimation results.

The GPS-and-IMU-based orientation estimating section 203 includes the GPS-and-IMU-based data acquiring section 261 and the orientation estimating section 262. The GPS-and-IMU-based data acquiring section 261 receives GPS data transmitted by the GPS satellite and identifying a position on the earth, supplies the received GPS data to the orientation estimating section 262, and also supplies, to the orientation estimating section 262, IMU data including the results of measurement by the inertial measurement unit including a gyro sensor.

On a basis of GPS data transmitted by the GPS satellite, the orientation estimating section 262 estimates the latitude and longitude corresponding to position information on the earth, and estimates and supplies the self-position and the self-direction to the estimation result integrating section 205. Additionally, the orientation estimating section 262 estimates information regarding the position on the earth on a basis of IMU data supplied by the IMU and including measurement results, to estimate the orientation.

Note that, as long as GPS data can be acquired, the orientation estimating section 262 can achieve relatively highly accurate orientation estimation on a basis of the GPS data. However, in some states such as the inside of a building and underground, GPS data corresponding to signals from the GPS satellite fails to be received, and thus, the orientation is estimated using a combination of the GPS data with measurement results including IMT data.

The data acquisition status detecting section 204 detects data acquisition statuses of the reflector-based orientation estimating section 201, the image-based orientation estimating section 202, and the GPS-and-IMU-based orientation estimating section 203, and outputs, to the estimation result integrating section 205, data acquisition status detection results corresponding to detection results.

More specifically, the data acquisition status detecting section 204 outputs the following to the estimation result integrating section 205 as the data acquisition status detection results, for example, information regarding the number of reflectors detected and surrounding brightness, which information affects the accuracy of the reflector-based orientation estimation results, information regarding the surrounding brightness, which information affects the accuracy of the image-based orientation estimation results, the number of satellites acquiring GPS data used for GPS position estimation, which number affects the accuracy of the GPS-and-IMU-based orientation estimation results, information regarding the temperature and the degree of vibration, which information affects, for example, a bias error in the inertial measurement unit, and the like.

The estimation result integrating section 205 weights the reflector-based orientation estimation results, the image-based orientation estimation results, and the GPS-and-IMU-based orientation estimation results on a basis of the data acquisition status detection results, integrates the weighted results by utilizing, for example, a Bayesian filter, an EKF (Extended Kalman Filter), or the like, and outputs integration results as orientation estimation results.

<Configuration Examples of Light Projecting Section and Light Receiving Section>

Now, configuration examples of the light projecting section 222 and the light receiving section 223 will be described with reference to FIG. 3. Note that, both right and left portions of an upper stage of FIG. 3 illustrate configuration examples of the light projecting section 222, and both right and left portions of a lower stage of FIG. 3 illustrate configuration examples of the light receiving section 223.

Figure 3:
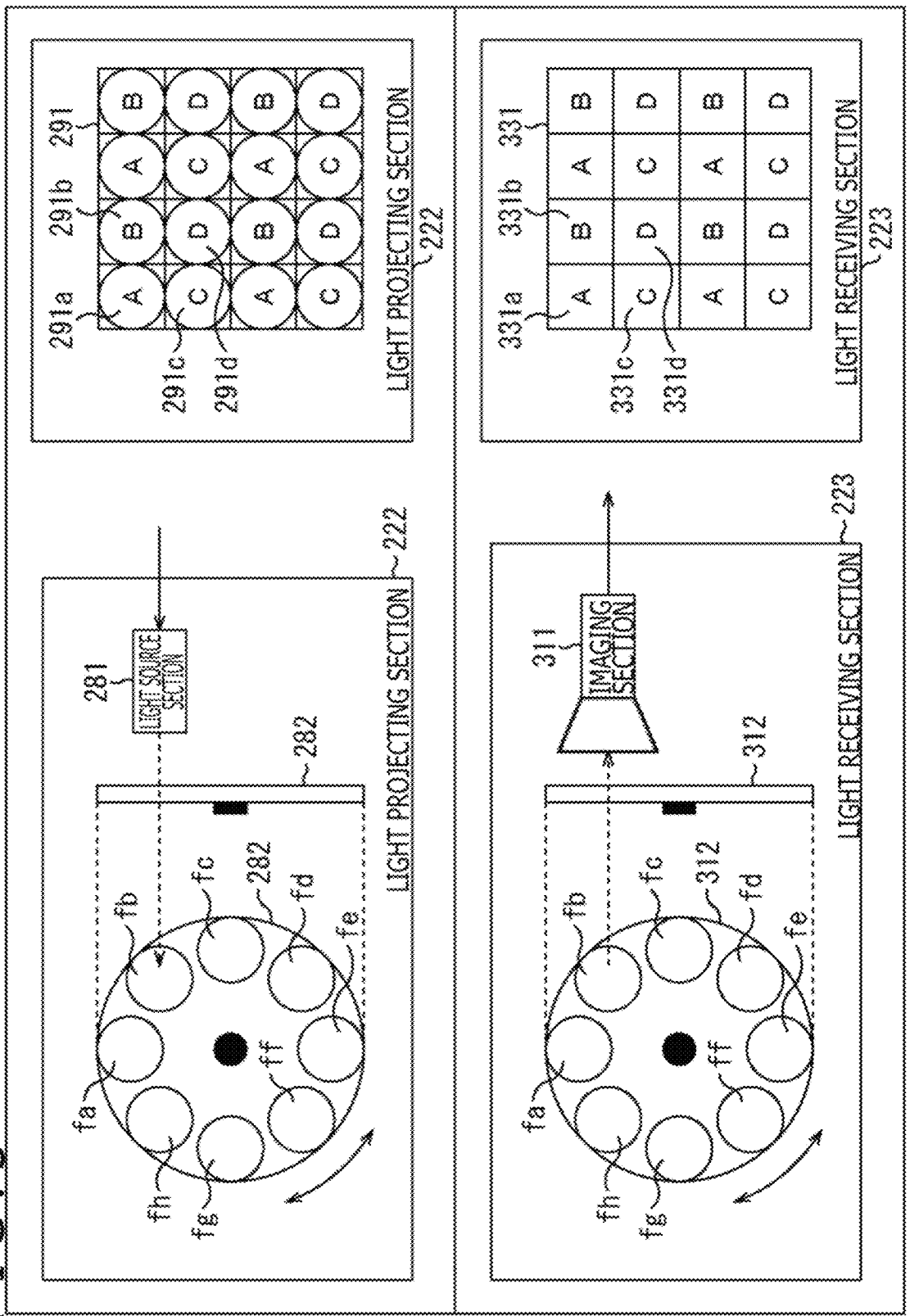
FIG. 3 is a diagram illustrating a configuration example of a light projecting section and a light receiving section in FIG. 2.

The upper left portion of FIG. 3 illustrates a first configuration example of the light projecting section 222 including a light source section 281 and a filter wheel 282. Note that, in the upper left portion of FIG. 3, the left portion is a front view of the filter wheel 282, and the right portion is a side view of the filter wheel 282 and the light source section 281. The light source section 281 emits light in the near infrared light band and causes light with a predetermined wavelength to pass through a filter in the filter wheel 282 to project the light into a surrounding area in a forward direction or the like of the vehicle 11.

That is, as illustrated in the left portion of the upper left portion of FIG. 3, the filter wheel 282 includes eight types of filters fa to fh provided concentrically around a rotation axis illustrated by a filled circle. The filters fa to fh respectively transmit light projected by the light source section 281 and having different wavelengths.

In such a configuration, the light projection adjusting section 221 rotates the filter wheel 282 around the rotation axis illustrated as a filled circle to switch among the filters fa to fh positioned at a front surface of the light source section 281, thus switching, within, for example, a range from 800 to 1000 nm, the wavelength of the light to be projected.

Note that the configuration example illustrated in the upper left portion of FIG. 3 includes eight filters to switch among eight types of wavelengths of light but eight or more or eight or less types of filters may be prepared for switching.

The upper right portion of FIG. 3 illustrates a second configuration example of the light projecting section 222 including LEDs (Light Emission Diodes) 291 arranged in an array shape and emitting light with different wavelengths in the near infrared light band. LEDs 291a to 291d in respective segments A to D in FIG. 3 are LEDs 291 emitting light with different wavelengths. The light projection adjusting section 221 selects the LED 291 with the wavelength of the light to be projected and causes the selected LED 291 to emit the light, thus projecting light in the near infrared light band having the predetermined wavelength.

Note that, The light projecting section 222 illustrated in the upper right portion of FIG. 3 projects light with four types of wavelengths. However, LEDs with four or more or four or less different types of wavelengths may be prepared for switching.

The lower left portion of FIG. 3 illustrates a first configuration example of the light receiving section 223 corresponding to the first configuration example of the light projecting section 222 in the upper left portion of FIG. 3. Note that, in the lower left portion of FIG. 3, the left portion is a front view of a filter wheel 312, and the right portion is a side view of the filter wheel 312 and an imaging section 311. As illustrated in the left portion of the lower left portion of FIG. 3, the filter wheel 312 includes a plurality of filters fa to fh provided concentrically around a rotation axis illustrated by a filled circle and transmitting light with different wavelengths. The imaging section 311 captures, via any of the filters fa to fh of the filter wheel 312, an image of the surroundings of the vehicle 11 such as the front of the vehicle 11.

In such a configuration, the light projection adjusting section 221 rotates the filter wheel 312 around the rotation axis illustrated as a filled circle to switch among the filters fa to fh, thus controllably causing the light projecting section 222 to project light. For example, the filters are switched to transmit reflected light with any wavelength within the range from 800 to 1000 nm, allowing the imaging section 311 to receive the light for imaging.

Note that the configuration example illustrated in the lower left portion of FIG. 3 includes eight filters to switch among eight types of wavelengths of light but eight or more or eight or less types of filters may be prepared for switching.

The lower right portion of FIG. 3 illustrates a second configuration example of the light receiving section 223 corresponding to the second configuration example of the light projecting section 222 in the upper right portion of FIG. 3. The second configuration example of the light receiving section 223 corresponds to an imaging section 331 including light receiving elements 331a to 331d arranged in an array shape and each including a BPF (Band Pass Filter) provided on a front surface of the light receiving element to transmit light with a predetermined wavelength.

In such a configuration, the light projection adjusting section 221 performs control to allow switching among the light receiving elements 331a to 331d each preceded by the BPF transmitting light with the same wavelength as that of light projected by the light projecting section 222.

Note that, in the lower right portion of FIG. 3, the light receiving elements 331a to 331d in respective segments A to D in FIG. 3 include the respective BPFs provided on the front surface of the light receiving element to transmit light with different wavelengths.

Additionally, the light receiving section 223 illustrated in the lower right portion of FIG. 3 is caused to receive light with four types of wavelengths. However, light receiving elements with four or more or four or less different types of wavelengths may be prepared for switching.

Furthermore, the light projecting section 222 may correspond to the first configuration example in the upper left portion of FIG. 3, while the light receiving section 223 may correspond to the second configuration example in the lower right portion in FIG. 3. The light projecting section 222 may correspond to the second configuration example in the upper right portion of FIG. 3, while the light receiving section 223 may correspond to the first configuration example in the lower left portion in FIG. 3.

Additionally, the light projected by the light projecting section 222 may be light other than near infrared light. For example, near infrared light may be used in a case where the light is to be made invisible to human beings, and visible light (for example, light with a wavelength ranging from 400 to 800 nm) may be used in a case where the light is to be used along with normal headlights at night or the like.

Furthermore, the light projecting section 222 and the light receiving section 223 may be used along with an in-vehicle camera provided, for example, in the headlights, on a dashboard, or in an upper part of a windshield.

<Principle of Detection by Light Projecting Section and Light Receiving Section>

Now, with reference to FIG. 4, a principle will be described in which light projected by the light projecting section 222 is reflected by the reflectors and received by the light receiving section 223 as reflected light.

Figure 4:
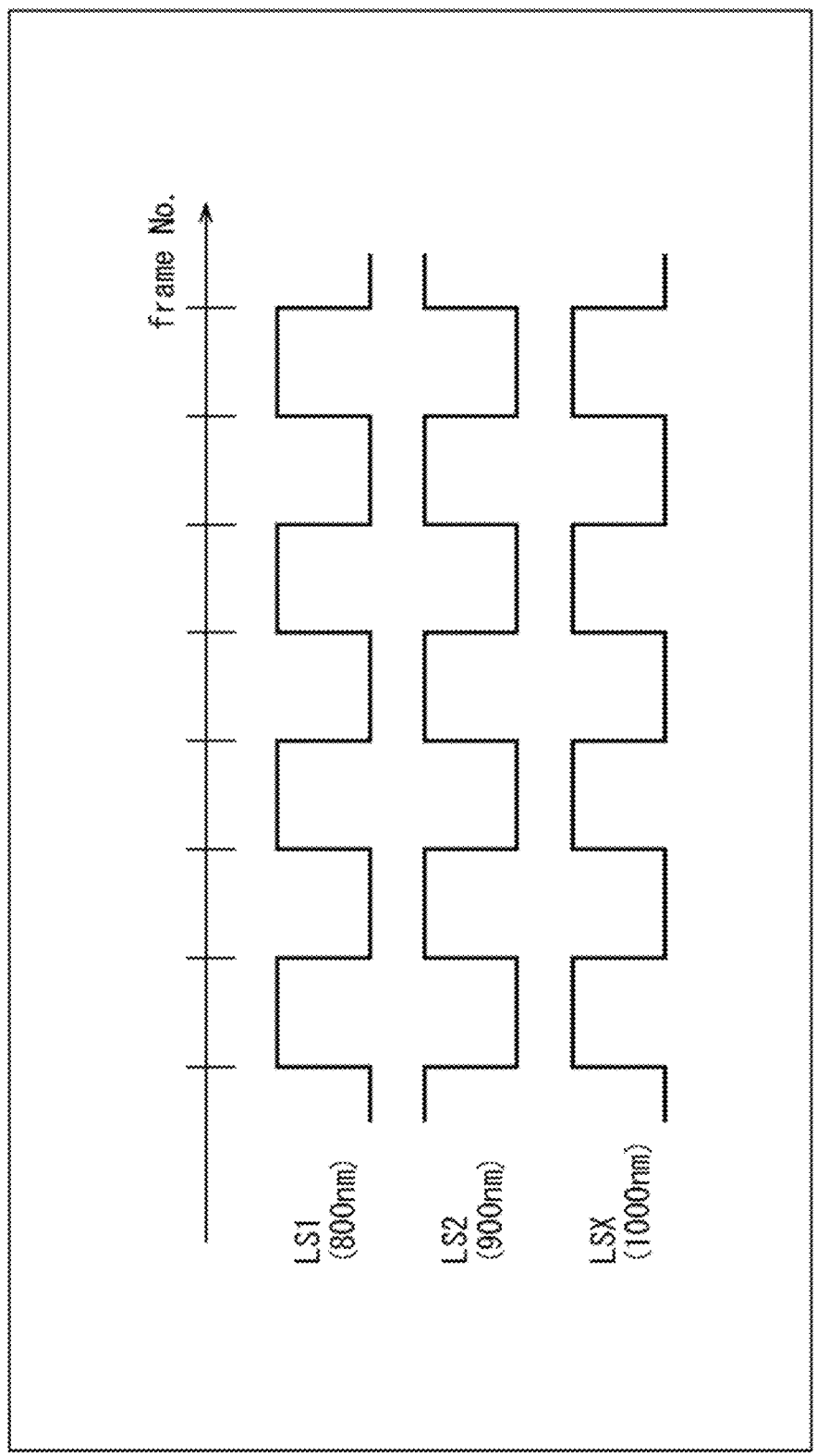
FIG. 4 is a diagram illustrating timings when the light projecting section projects light.

For example, as illustrated in the uppermost stage in FIG. 4, in a case where the light projecting section 222 projects, for example, light LS1 with a wavelength of 800 mm such that the light is emitted and put out in units of one frame, the light receiving section 223 can receive only the light LS1 with a wavelength of 800 nm and fails to receive light other than the light with a wavelength of 800 nm, for example, light LS2 with a wavelength of 900 nm illustrated in the middle stage in FIG. 4 and light LSX with a wavelength of 1000 nm illustrated in the lowermost stage in FIG. 4. Thus, possible interference by light with a different wavelength is inhibited, and only the light LS1 with a wavelength of 800 nm reflected by the reflectors is reliably received, allowing only the light LS1 projected from the subject vehicle to be reliably detected as reflected light from the reflectors.

Additionally, misdetection can be reduced by using the light projecting section 222 to project the light LS1 with a wavelength of 800 nm and with a first period such that the light is emitted and put out on a frame-by-frame basis, as illustrated in the uppermost stage in FIG. 4, and to project the light LS2 with a wavelength of 900 nm and with a second period such that the light is emitted and put out on a frame-by-frame basis, as illustrated in the middle sage in FIG. 4. That is, the waveform in the uppermost stage in FIG. 4 and the waveform in the middle stage in FIG. 4 have completely opposite phases at a High timing (timing when the light is emitted) and at a Low timing (timing when the light is put out). Thus, the light LS1 projected from the subject vehicle for a time equal to one frame can be exclusively and reliably detected as reflected light from the reflectors.

On a basis of such a principle, by checking the wavelength and period of received light, the light receiving section 223 can receive the light while recognizing that the light has been projected by the light projecting section 222 of the subject vehicle. Even with the presence of light projected from another vehicle, the interference of the light is suppressed, enabling a reduction in misdetection.

<Extraction of Reflector Areas>

Now, with reference to FIG. 5, a method for extracting reflector areas will be described.

Figure 5:
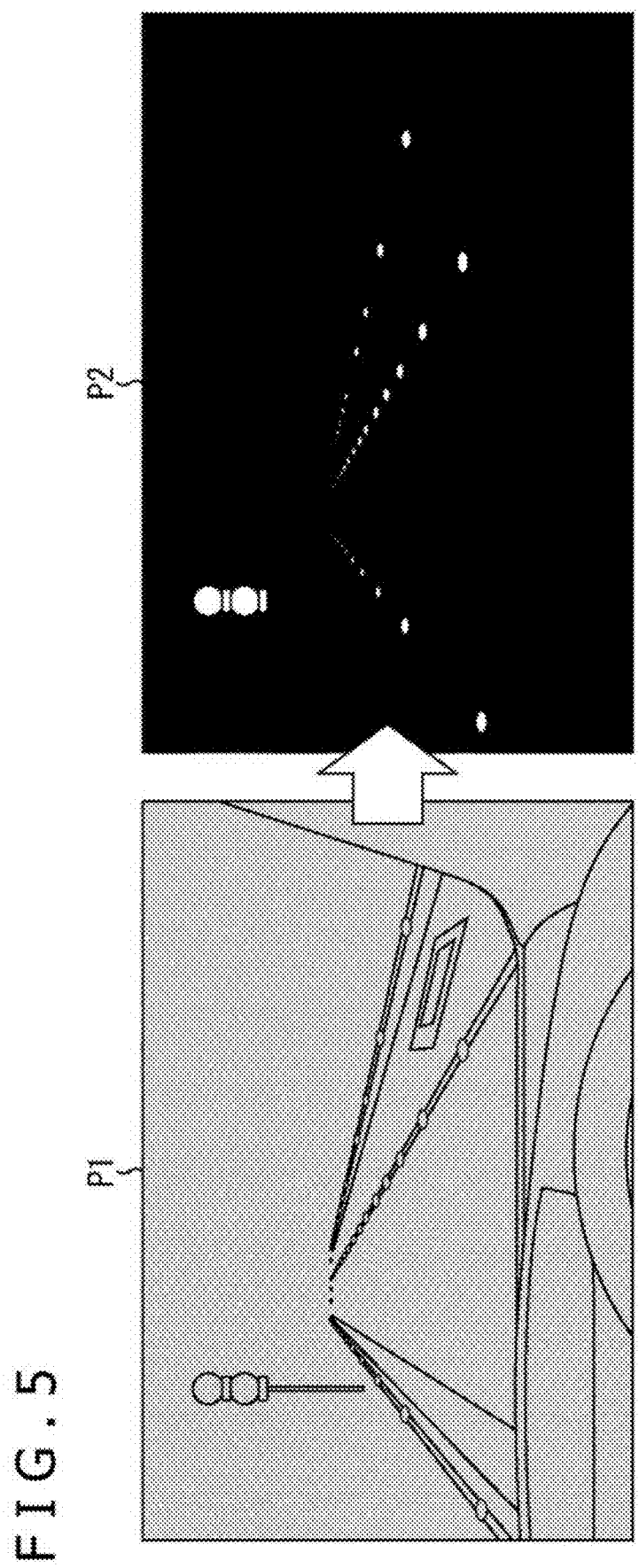
FIG. 5 is a diagram illustrating a normal image and a reflector image.

In a case where the light projecting section 222 projects light with a predetermined wavelength, for example, on a road in front of the vehicle 11 as illustrated in a left portion of FIG. 5 and the light receiving section 223 captures an image P1 of the front of the vehicle, an image like an image P2 in a right portion of FIG. 5 is obtained in a case where a difference image is determined between an image captured by the light receiving section 223 at a timing when the light is being projected and an image captured by the light receiving section 223 at a timing when the light is not being projected, and is further binarized using a predetermined threshold.

That is, the image P1 is captured at nighttime and includes a road image and a part of the vehicle 11, reflectors on a centerline and sidelines, and a sign in an upper left portion of the figure. In contrast, the image P2 depicts only reflected light from areas where the reflectors are provided. Note that the reflectance of the road sign is an object higher than a predetermined value and thus that, in addition to the reflectors provided on the road, the sign similarly reflects the projected light.

That is, in a case where the light projecting section 222 and the light receiving section 223 described with reference to FIG. 3 are caused to repeat projection and putting-out of light with a predetermined cycle and to determine the difference image between the image during light projection and the image during lights-out, an image illustrated as the image P2 can be acquired in which only the images of the reflectors, the sign, and the like, which have high reflectances, exhibit high brightnesses. Thus, the reflector area extracting section 224 extracts, as reflector areas, ranges in the image P2 that have brightness higher than a predetermined brightness level. Furthermore, the reflector area extracting section 224 removes, as noise, those of the thus determined reflector areas each of which has an area size smaller than a predetermined value. As a result, reflector areas from which noise has been removed can be extracted.

<Extraction of Feature Points (Gravity Center Positions)>

Now, with reference to FIG. 6, a method will be described in which the feature point extracting section 225 extracts the gravity center positions of the reflector areas as feature points.

Figure 6:
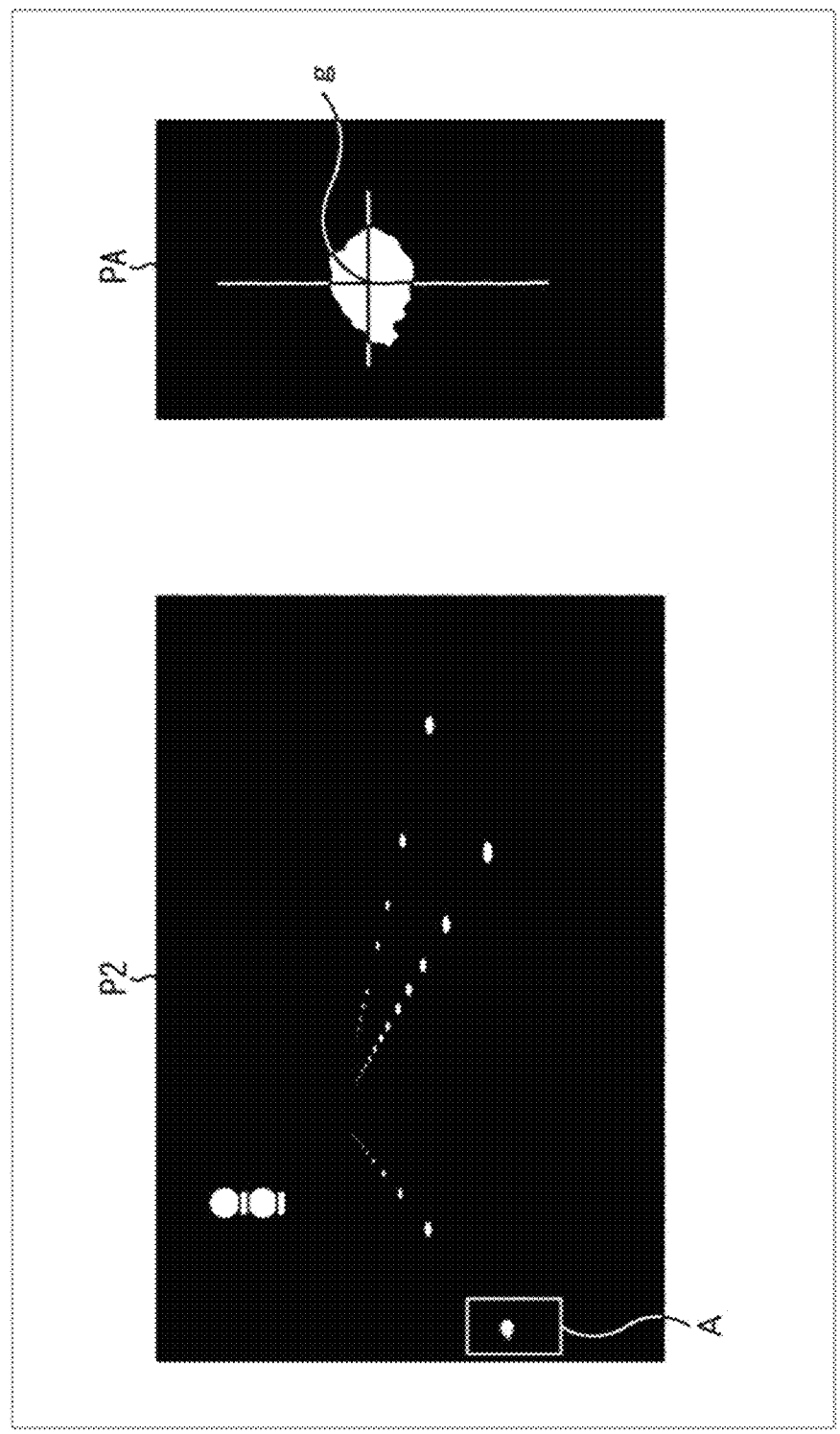
FIG. 6 is a diagram illustrating a manner of determining a gravity center of the reflector area.

For example, for a reflector area A as illustrated in a lower left portion of an image P2 in a left portion of FIG. 6 corresponding to the image P2 in FIG. 5, a gravity center position g of the reflector area A in an image PA illustrated in a right portion of FIG. 6 is determined as indicated by the following Equation (1)

$$m_{p,q} = \sum_x \sum_y x^p y^q I(x, y) \quad \text{[Math 1]}$$

Here, $m_{p,q}$ in Equation (1) is expressed by the following Equation (2).

Gravity center $$(x, y) = \left(\frac{m_{1,0}}{m_{0,0}}, \frac{m_{0,1}}{m_{0,0}}\right). \quad \text{[Math 2]}$$

That is, the gravity center position of the pixel position of a pixel constituting the reflector area A and having brightness higher than a predetermined value is determined as the gravity center position g of the reflector area.

In a case where the gravity center position g is determined as described above, the captured image may depict a deformed reflector instead of the actual reflector shape, as seen in the reflector areas in the image P2. However, the gravity center positions are not significantly changed. Thus, the positional relationship of the reflectors can be accurately reproduced.

Furthermore, the feature point extracting section 225 considers, as noise, those of the reflector areas which are smaller than a processing size and removes these reflector areas.

<Image-Based Orientation Estimation Results and Reflector-Based Orientation Estimation Results>

Now, with reference to FIG. 7, the image-based orientation estimation results and reflector-based orientation estimation results will be described.

Figure 7:
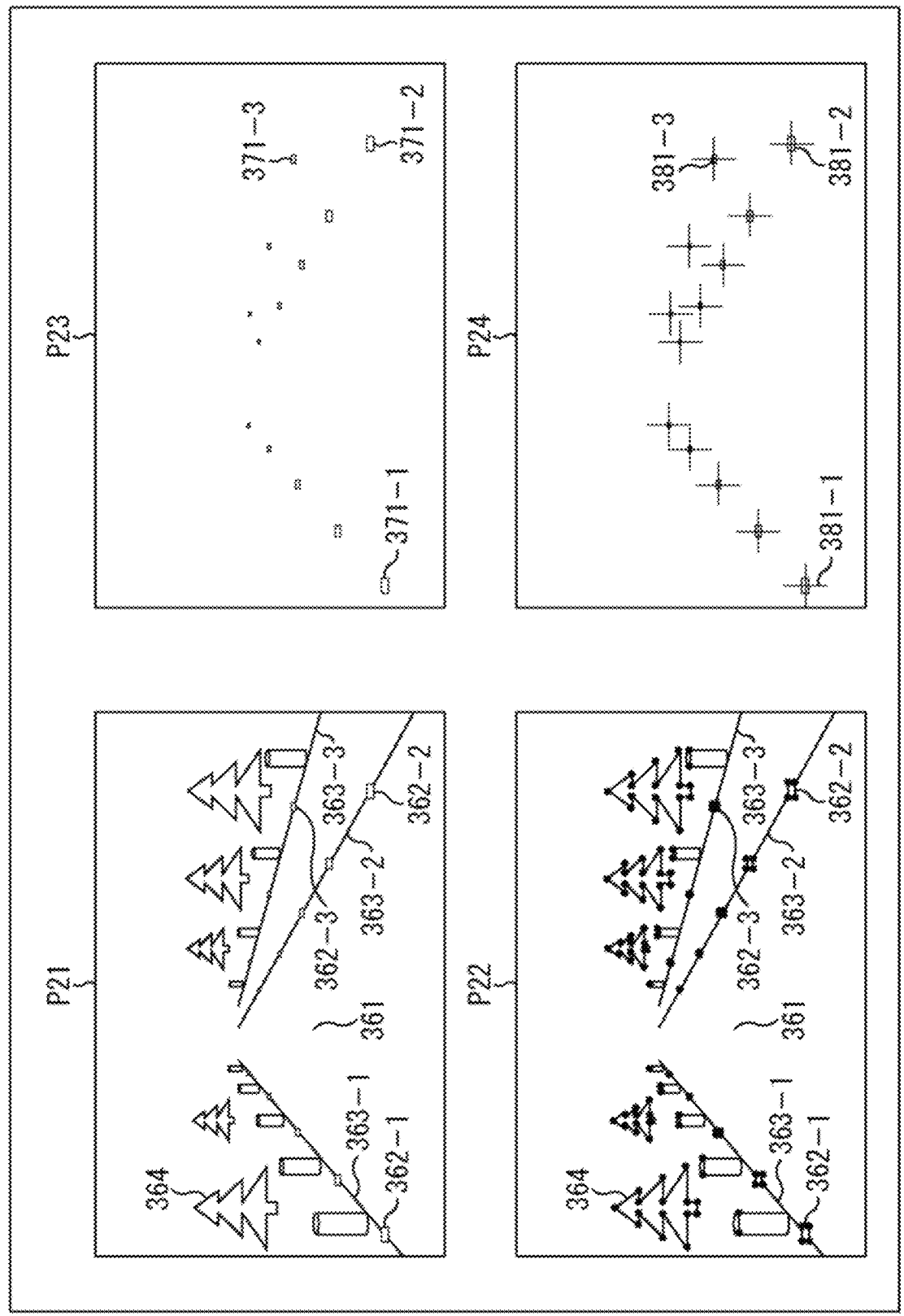
FIG. 7 is a diagram illustrating each of the normal image, a feature point image including corner points, an image from which reflector areas have been extracted, and a feature point image including the gravity center positions of the reflector areas.

A case is considered in which an image as illustrated by an image P21 in an upper left portion of FIG. 7 is captured by the image acquiring section 241. The image P21 in the upper left portion of FIG. 7 depicts a road 361 in the center, depicts a sideline 363-1, a centerline 363-2, and a sideline 363-3 in this order from the left, depicts reflectors 362-1 to 362-3 on the respective lines in this order from the left, and depicts trees 364 on the side of the road 361.

The feature point extracting section 242 extracts, from the image P21, for example, feature point information including corner points as illustrated in an image P22 in a lower left portion of FIG. 7. On a basis of the image P22 corresponding to the feature point information including the extracted corner points, the orientation estimating section 243 recognizes objects and estimates, on a basis of the arrangement of the recognized objects, an orientation including the self-position and the self-direction, as image-based orientation estimation results.

In contrast, the reflector area extracting section 224 extracts reflector areas as illustrated in an image P23 in an upper right portion of FIG. 7. That is, in the image P23 in the upper right portion of FIG. 7, reflector areas 371-1 to 371-3 are extracted at positions corresponding to the reflectors 362-1 to 362-3 in the image P21.

Note that, in the image P21 in the upper left portion of FIG. 7, reflectors other than the reflectors 362-1 to 362-3 are also depicted on the sideline 363-1, the centerline 363-2, and the sideline 363-3 but carry no reference signs. Additionally, the reflectors other than the reflectors 362-1 to 362-3 are arranged at substantially regular intervals on each of the sideline 363-1, the centerline 363-2, and the sideline 363-3.

Additionally, in the image P23 illustrated in the upper right portion of FIG. 7, the reflector areas other than the reflector areas 371-1 to 371-3 are extracted at positions in the image P21 in the upper left portion of FIG. 7 which positions correspond to the reflectors not carrying the reference signs of the reflectors 362-1 to 362-3.

The feature point extracting section 225 determines a gravity center position 381 of each reflector area on a basis of information regarding the reflector area 371 in the image P23 in the upper right portion of FIG. 7, and generates, for example, feature point information including feature points indicating the positions of the reflector areas as in an image P24 in a lower right portion of FIG. 7. In the image P24, gravity center positions 381-1 to 381-3 corresponding to the reflector areas 371-1 to 371-3 carry reference signs, whereas gravity center positions carrying no reference signs are expressed as cross marks.

On a basis of the image P24 corresponding to feature point information including the gravity center positions of the reflector areas, the orientation estimating section 243 estimates the orientation including the self-position and the self-direction as reflector-based orientation estimation results.

In a case where the objects in the image P21 are recognized and the self-position and the self-direction are estimated, the objects are recognized on a basis of the feature point information including the corner points illustrated in the image P22, and the self-position and the self-direction are estimated as image-based orientation estimation results. Incidentally, for the image-based orientation estimation results, in a case where the surroundings form a bright place having sufficient brightness when the image P21 is acquired, the orientation can be highly accurately estimated because a large number of objects can be recognized. However, in a dark place, the corner points corresponding to the feature points in the image P21 are difficult to extract, and the feature points as illustrated in the image P22 are difficult to extract. Thus, the image-based orientation estimation results may have reduced accuracy in orientation estimation.

In contrast, with the reflector-based orientation estimation results obtained from the image P23 depicting the reflector areas as feature point information by using the image P24 corresponding to the feature point information including the gravity center position of each reflector area, highly accurate recognition can be achieved even in a dark place. However, the reflector-based orientation estimation results do not have, in a bright place, as large information amount as the image P22 corresponding to the feature point information based on the image P21, and is thus not highly accurate than the image-based orientation estimation results.

<Integration of Orientation Estimation Results>

Now, a method will be described in which the estimation result integrating section 205 integrates the reflector-based orientation estimation results, the image-based orientation estimation results, and the GPS-and-IMU-based orientation estimation results.

The reflector image-based orientation estimation results, and the GPS-and-IMU-based orientation estimation results respectively vary in the accuracy related to orientation estimation according to data acquisition statuses of the light receiving section 223, the image acquiring section 241, and the GPS and IMU data acquiring section 261.

Thus, the estimation result integrating section 205 weights the reflector-based orientation estimation results, the image-based orientation estimation results, and the GPS-and-IMU-based orientation estimation results according to the data acquisition statuses of the light receiving section 223, the image acquiring section 241, and the GPS and IMU data acquiring section 261 supplied from the data acquisition status detecting section 204, and integrates the results using, for example, the Bayesian filter, the EKF (Extended Kalman Filter), and the like.

Now, the integration of the orientation estimation results will be described using an example of a trajectory corresponding to changes in self-position. For example, the following case will be considered: the real trajectory of the vehicle 11 extends in a circle as illustrated by a trajectory 401 of a thin line in FIG. 8, all the data acquisition statuses are favorable, and the three types of estimation results including the reflector-based orientation estimation results, the image-based orientation estimation results, and the GPS-and-IMU-based orientation estimation results are evenly utilized.

In this case, for example, when the image-based orientation estimation results and the GPS-and-IMU-based orientation estimation results are expressed as plots 402 including filled circles in the figure and the reflector-based orientation estimation results are expressed as plots 403 including blank circles in the figure, an integrated trajectory 404 indicates the results of integration of the results of the plots 402 and 403 using the Bayesian filter, the EKF (Extended Kalman Filter), and the like.

That is, the integrated trajectory 404 is estimated as a trajectory close to the real trajectory 401, the integrated trajectory 404 resulting from the integration utilizing the plots 402 of the image-based orientation estimation results and the GPS-and-IMU-based orientation estimation results and the plots 403 of the reflector-based orientation estimation results.

Additionally, in a case where, in the data acquisition status, information regarding surrounding illuminance can be acquired, when feature points serving as corner points fail to be stably acquired, for example, at night corresponding to a dark time, the weight for the image-based orientation estimation results may be reduced or the weight for the reflector-based orientation estimation results may be increased. This modifies the integrated trajectory 404 such that the integrated trajectory is close to a trajectory of the plots 403 of the reflector-based orientation estimation results.

Furthermore, in the daytime or the like when a sufficient illuminance is obtained, the weight may be increased for the image-based orientation estimation results obtained using images with a large amount of information corresponding to recognizable objects or may be reduced for the reflector-based orientation estimation results.

Figure 8:
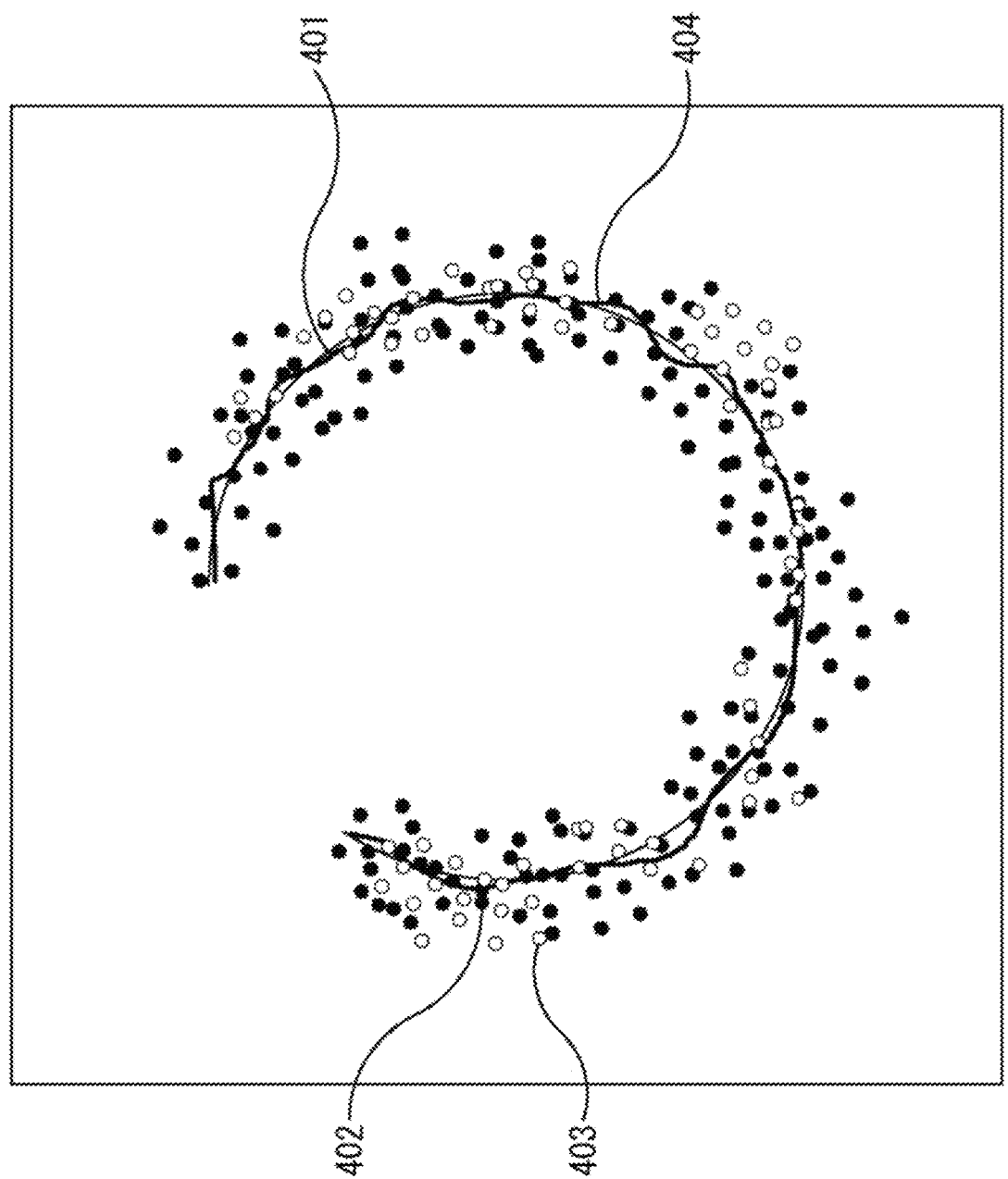
FIG. 8 is a diagram illustrating integration of estimation results.

Note that, in FIG. 8, each plot is obtained using the self-position estimated in frame units (High or Low periods in the waveform in FIG. 4).

Additionally, in a case where GPS data is received from only a small number of satellites, the GPS has low accuracy but it can be assumed that a certain degree of accuracy is guaranteed for by data including the results of position measurement performed by the IMU.

However, in a case where the position measurement based only on IMU data has been continued for a long period of time since disruption of reception of GPS data from the GPS satellite, bias errors from the IMU accumulate depending on temperature or the degree of vibration, leading to reduced accuracy.

Thus, when the orientation estimation based only on the IMU data has been continued since disruption of reception of the GPS data from the GPS satellite, the weight for the GPS-and-IMU-based orientation estimation results may be reduced depending on the temperature or the degree of vibration, which affect the bias errors.

Note that, for reflectors of moving subjects such as reflectors attached to a bicycle, a human being, and the like, cumulative bias errors are likely to affect the estimation of the self-position, and are thus desirably removed using RANSAC (Random Sample Consensus) or the like.

<Orientation Estimation Processing in Configuration Example for Estimating Orientation in FIG. 2>

Figure 9:
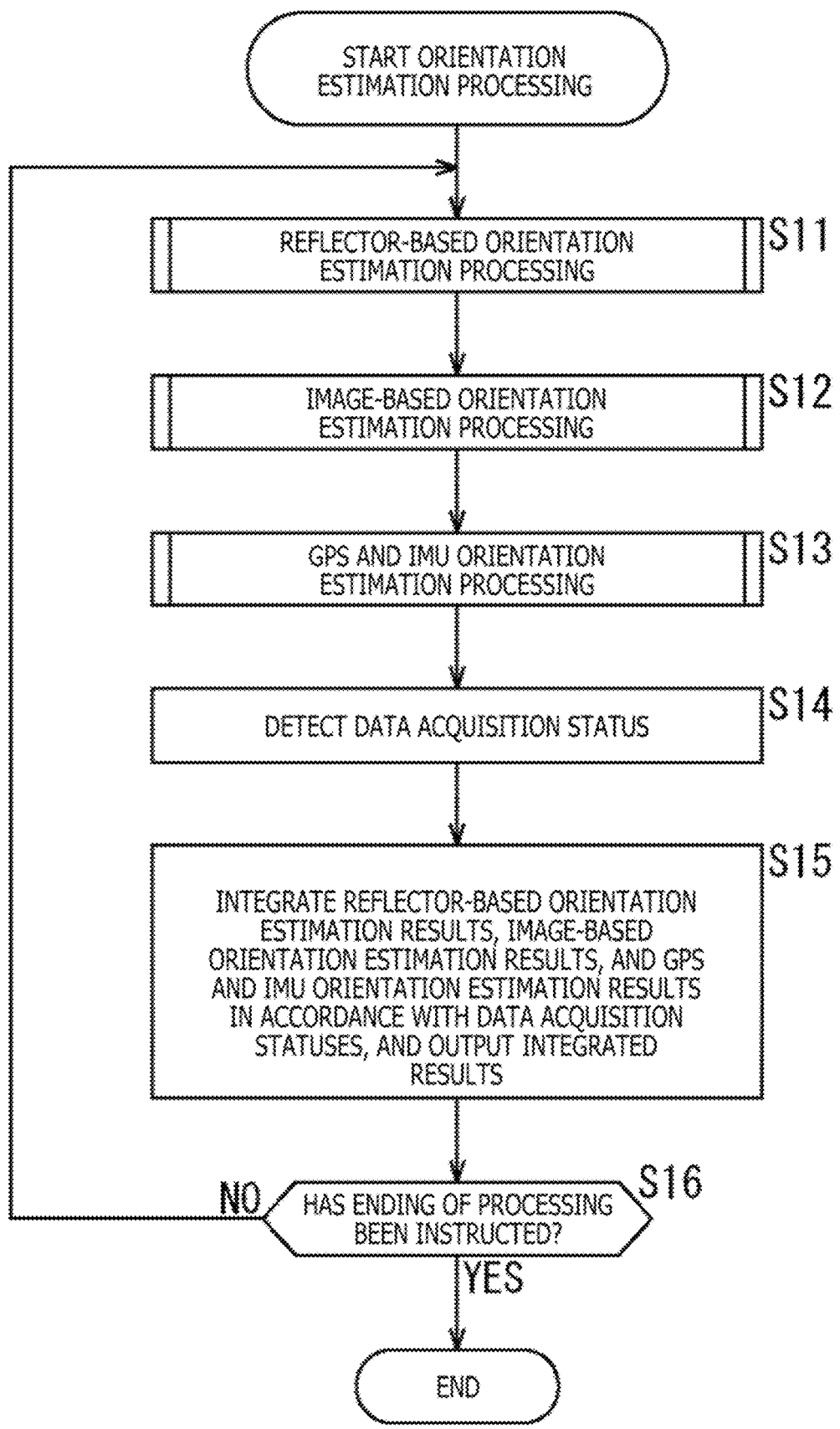
FIG. 9 is a flowchart illustrating orientation estimation processing.

Now, with reference to a flowchart in FIG. 9, orientation estimation processing will be described that is executed in a configuration example in which the orientation of the vehicle 11 in FIG. 2, that is, the self-position and the self-direction, is estimated.

In step S11, the reflector-based orientation estimating section 201 executes reflector-based orientation estimation processing to estimate the self-orientation by utilizing reflectors, and outputs the self-orientation to the estimation result integrating section 205 as reflector-based orientation estimation results. Note that the reflector-based orientation estimation processing will be described below in detail with reference to a flowchart in FIG. 10.

In step S12, the image-based orientation estimating section 202 executes image-based orientation estimation processing to estimate the self-orientation by utilizing images, and outputs the self-orientation to the estimation result integrating section 205 as image-based orientation estimation results. Note that the image-based orientation estimation processing will be described below in detail with reference to a flowchart in FIG. 12.

In step S13, the GPS-and-IMU-based orientation estimating section 203 executes GPS-and-IMU-based orientation estimation processing to estimate the self-orientation by utilizing GPS and IMU data, and outputs the self-orientation to the estimation result integrating section 205 as GPS-and-IMU-based orientation estimation results. Note that the GPS-and-IMU-based orientation estimation processing will be described below in detail with reference to a flowchart in FIG. 13.

In step S14, the data acquisition status detecting section 204 detects the data acquisition statuses of the light receiving section 223, the image acquiring section 241, and the GPS and IMU data acquiring section 261, and supplies detection results to the estimation result integrating section 205.

That is, the data acquisition status as used herein refers to, for example, information regarding the surrounding illuminance, which affects the detection accuracy of the light receiving section 223 and the image acquiring section 241, and that of the number of satellites from which GPS data can be acquired, which affects the detection accuracy of the GPS and IMU data acquiring section 261, and the temperature and the vibration level, which affect the bias errors in the IMU data.

In step S15, the estimation result integrating section 205 applies, to the reflector-based orientation estimation results, the image-based orientation estimation results, and the GPS-and-IMU-based orientation estimation results, the respective weights corresponding to the data acquisition statuses, integrates the weighted results using the Bayesian filter, the EKF (Extended Kalman Filter), and the like, and outputs integration results as orientation estimation results, as described with reference to FIG. 8.

In step S16, whether or not the user has operated the input section 101 to instruct ending of the processing is determined, and in a case where the ending has not been instructed, the processing returns to step S11, where the subsequent processing is repeated. That is, the processing in steps S11 to S16 is repeated until the ending is instructed. Then, in step S16, in a case where the ending is considered to have been instructed, the processing ends.

With the above-described processing, the reflector-based orientation estimation results, the image-based orientation estimation results, and the GPS-and-IMU-based orientation estimation results are respectively determined and weighted according to the data acquisition statuses that affect accuracy of each of the results, the weighted results are integrated, and the integration results are output as orientation estimation results. As a result, the orientation estimation results determined by the three types of estimation methods are weighted according to the data acquisition statuses, and by integrating the weighted results, and the orientation is estimated. Thus, the orientation estimation can be highly accurately achieved.

<Reflector-Based Orientation Estimation Processing>

Figure 10:
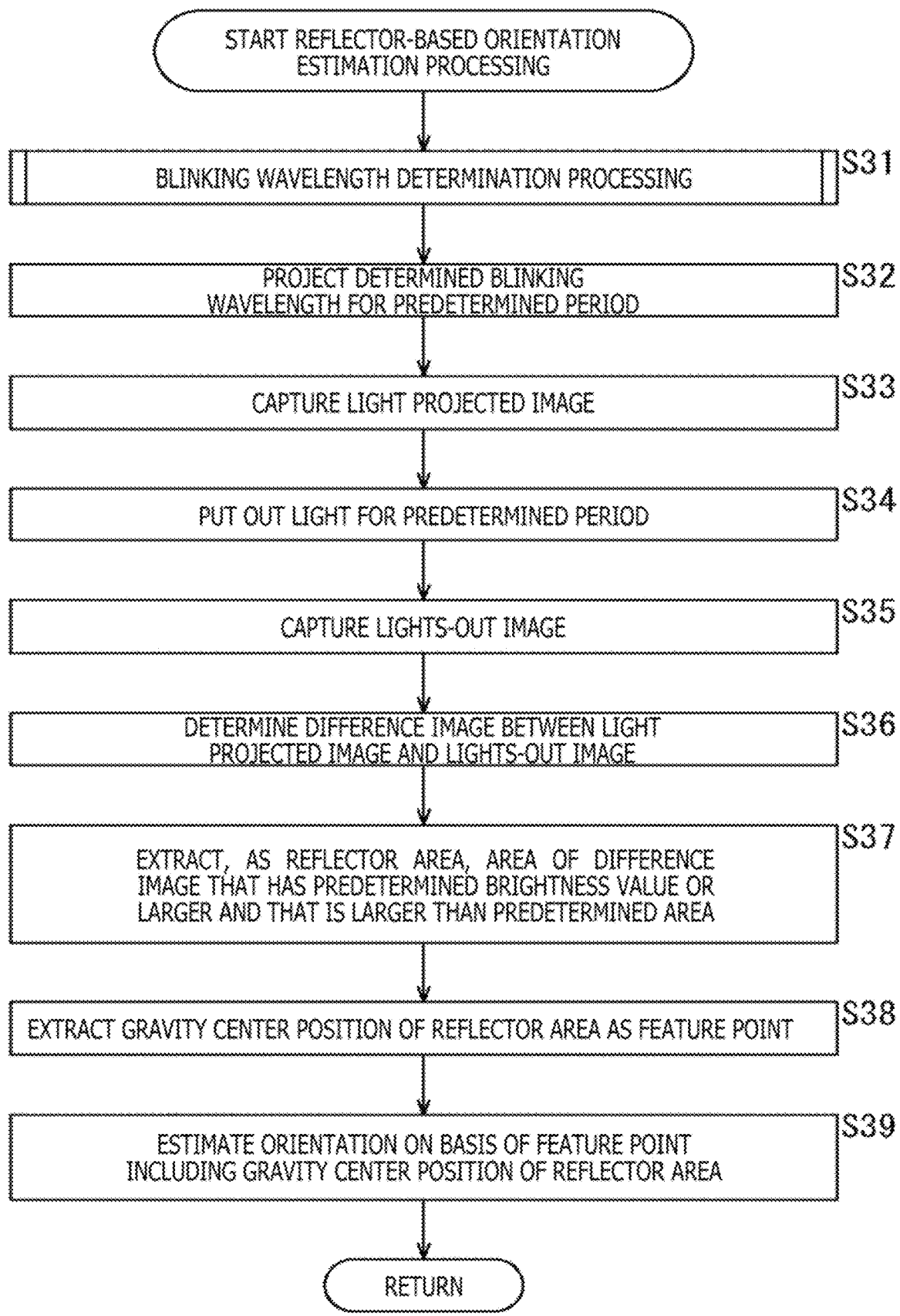
FIG. 10 is a flowchart illustrating reflector-based orientation estimation processing.

Now, with reference to a flowchart in FIG. 10, reflector-based orientation estimation processing executed by the reflector-based orientation estimating section 201 in FIG. 2 will be described.

In step S31, the light projection adjusting section 221 executes blinking wavelength determination processing to cause the light projecting section 222 to blink (repeat emission and putting-out of light alternately) to determine the wavelength of projected light. Note that the blinking wavelength determination processing will be described below in detail with reference to a flowchart in FIG. 11.

In step S32, the light projection adjusting section 221 causes the light projecting section 222 to emit, for a predetermined period of time corresponding to, for example, one frame, light with a blinking wavelength determined by the processing in step S31. More specifically, in a case where, for example, the light projecting section 222 is configured as illustrated in the upper left portion of FIG. 3, the light projection adjusting section 221 rotates the filter wheel 282 as necessary to cause one of the filters fa to fh that transmits light with the determined wavelength to transmit the light from the light source section 281, thus causing the light source section 281 to emit the light.

Additionally, in a case where the light projecting section 222 is configured as illustrated in the upper right portion of FIG. 3, the light projection adjusting section 221 identifies one of the LEDS 291a to 291d that emits light with the determined blinking wavelength to cause the identified LED 291 to emit the light.

In step S33, the light projection adjusting section 221 adjusts the light receiving section 223 such that the light receiving section 223 allows capturing of an image including light with the determined blinking wavelength. The light projection adjusting section 221 controls and causes the light receiving section 223 to receive light for a predetermined period of time at a timing when the light projecting section 222 is projecting light, to capture an image corresponding to the received light, and causes the reflector area extracting section 224 to output the image. Note that an image captured while the light projecting section 222 is projecting light is hereinafter referred to as a light projection image.

More specifically, in a case where the light receiving section 223 is configured as illustrated in the lower left portion of FIG. 3, the light projection adjusting section 221 rotates the filter wheel 312 such that one of the filters fa to fh that transmits light with a wavelength determined as the wavelength of light projected by the light projecting section 222 is placed to precede the imaging section 311. The light projection adjusting section 221 further controls the imaging section 311 such that an image is captured for a predetermined period of time at a timing when the light projecting section 222 is projecting light.

Additionally, in a case where the light receiving section 223 is configured as illustrated in the lower right portion of FIG. 3, the light projection adjusting section 221 identifies one of the light receiving elements 331a to 331d that includes a BRF transmitting light with the determined blinking wavelength.

In step S34, the light projection adjusting section 221 causes the light projecting section 222 to keep the light out for a predetermined period corresponding to, for example, one frame.

In step S35, the light projection adjusting section 221 controls and causes the light receiving section 223 to capture an image at a timing when the light projecting section 222 puts out the light and to output the image to the reflector area extracting section 224. Note that an image captured while the light projecting section 222 is not emitting light is hereinafter referred to as an lights-out image.

In step S36, the reflector area extracting section 224 determines a difference between a pixel at a position in the light projection image and a pixel at the same position in the lights-out image, and determines a difference image including the determined value of the difference between the pixels.

In step S37, the reflector area extracting section 224 extracts, as reflector area candidates, pixels in the difference image having a brightness value larger than a predetermined value.

In step S38, for each of the pixels corresponding to reflector area candidates, the reflector area extracting section 224 determines the number of those of the pixels adjacent to the above-described pixel which correspond to reflector area candidates. The pixels for which the number of adjacent pixels corresponding to reflector area candidates is smaller than a predetermined value are considered to be certain noise instead of reflector areas, and are excluded from the reflector area candidates. The reflector area extracting section 224 executes similar processing on all the pixels corresponding to reflector area candidates, considers the remaining reflector area candidates to be reflector areas, and outputs information regarding the determined reflector areas to the feature point extracting section 225. That is, with this processing, the individual reflector areas are areas in the difference image that have predetermined brightness or higher and that are larger than a predetermined size.

In step S39, the feature point extracting section 225 extracts feature points including the gravity center positions of the reflector areas on a basis of information regarding the reflector areas, and outputs the feature points to the orientation estimating section 226 as feature point information.

In step S40, the orientation estimating section 226 estimates the self-orientation through, for example, SLAM on a basis of the feature points information including the gravity center positions of the reflector areas, and outputs estimation results to the estimation result integrating section 205 as reflector-based orientation estimation results.

The above-described processing enables the orientation of the vehicle 11 including the self-position and the self-direction to be estimated using the surrounding reflectors. The reflectors can be accurately detected even at night, and thus, in a dark place, in particular, the orientation including the self-position and the direction can be highly accurately estimated.

The orientation estimation processing using reflectors has been described above. However, any objects other than the reflectors may be used as long as the objects can reflect projected light at a reflectance higher than a predetermined reflectance. For example, mirrors, road signs, and lines on the road (white lines, yellow lines, and the like) may be used. In particular, the projected light is reflected at a higher reflectance by mirrors, road signs, lines on the road (white lines, yellow lines, and the like) and the like that include a retroreflective material. Additionally, the projected light may have any other wavelength. For example, near infrared light may be used in a case where the light is to be made invisible to human beings, whereas visible light may be used in a case where, for example, at night, normal headlights and the light projecting section 222 are to be used at the same time.

<Blinking Wavelength Determination Processing>

Figure 11:
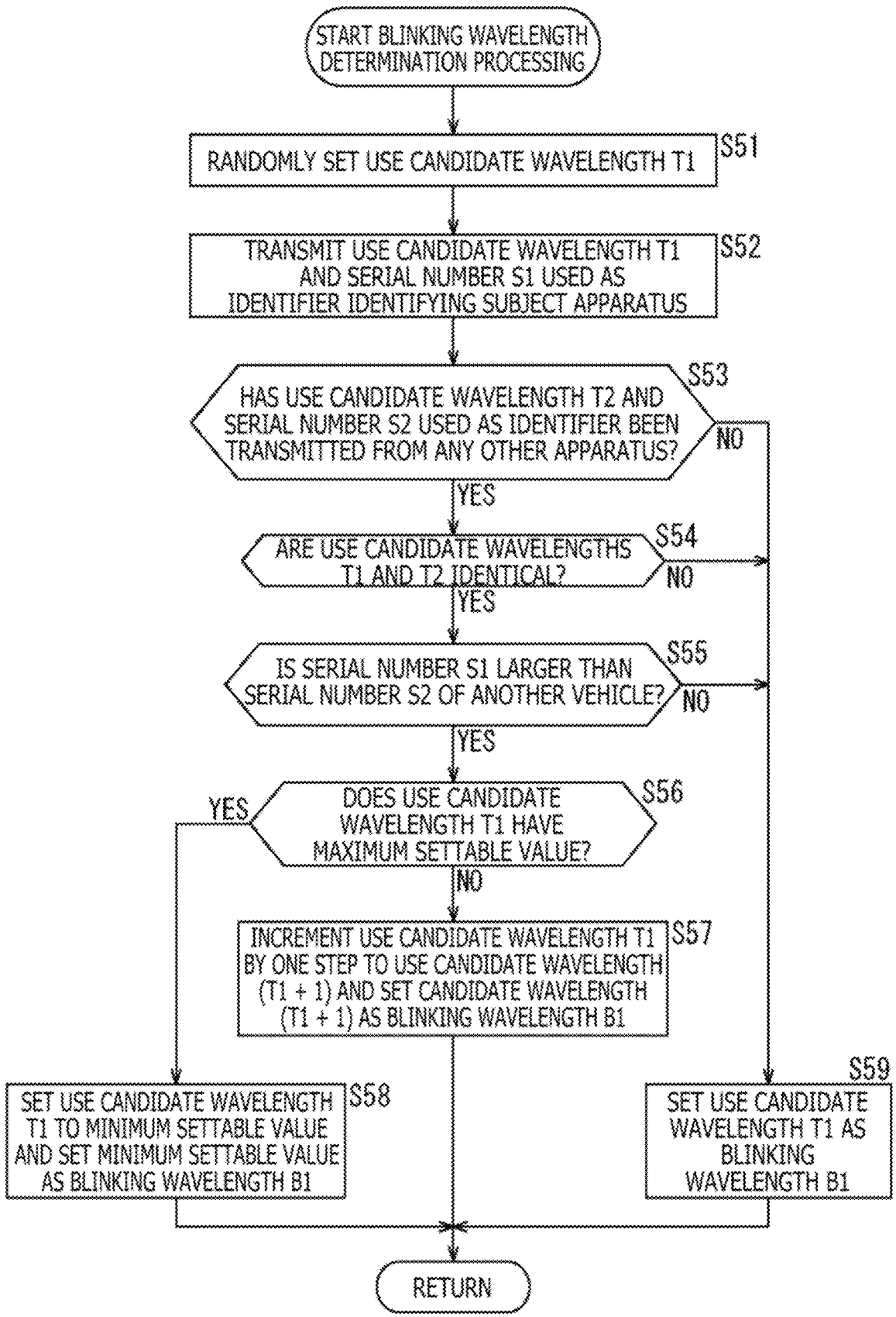
FIG. 11 is a flowchart illustrating blinking wavelength determination processing.

Now, with reference to a flowchart in FIG. 11, the blinking wavelength determination processing will be described.

In step S51, the light projection adjusting section 221 randomly sets a use candidate wavelength T1.

In step S52, the light projection adjusting section 221 uses a signal with a predetermined frequency band such as a radio signal to transmit, to the surroundings, the use candidate wavelength T1 and a serial number S1 identifying the subject vehicle.

In step S53, the light projection adjusting section 221 determines whether or not a use candidate wavelength T2 and a serial number S2 serving as an identifier have been transmitted from the light projection adjusting section 221 of another vehicle. That is, in a case where another vehicle configured as described with reference to FIG. 2 is present in the vicinity, the another vehicle, like the subject vehicle, transmits the use candidate wavelength T2 and the serial number S2, and thus, whether or not the use candidate wavelength T2 and the serial number S2 are present is checked.

In step S53, for example, in a case where the light projection adjusting section 221 of the another vehicle transmits the use candidate wavelength T2 and the serial number S2 to the subject vehicle, the processing proceeds to step S54.

In step S54, the light projection adjusting section 221 determines whether or not the use candidate wavelength T1 for the subject vehicle is the same as the use candidate wavelength T2 transmitted from the another vehicle. In step S54, in a case where the use candidate wavelength T1 for the subject vehicle is the same as the use candidate wavelength T2 transmitted from the another vehicle, the possibility of erroneous determination caused by interference is determined in the reflector-based orientation estimation processing. The processing proceeds to step S55.

In step S55, the light projection adjusting section 221 determines whether or not the serial number S1 for the subject vehicle is larger than the serial number S2 transmitted from the another vehicle. In step S55, in a case where the serial number S1 for the subject vehicle is larger than the serial number S2 transmitted from the another vehicle, the processing proceeds to step S56.

In step S56, the light projection adjusting section 221 determines whether or not the use candidate wavelength T1 for the subject vehicle is the maximum settable wavelength. In step S56, in a case where the use candidate wavelength T1 for the subject vehicle is not the maximum settable wavelength, the processing proceeds to step S57.

In step S57, the light projection adjusting section 221 increments the use candidate wavelength T1 by one step to a use candidate wavelength (T1+1), and sets the use candidate wavelength (T1+1) as a blinking wavelength B1. That is, usable wavelengths are numbered in the order according to the wavelength from the minimum wavelength to the maximum wavelength, and in a case where the use candidate wavelength is not the maximum wavelength, the blinking wavelength is set equal to a one-step larger wavelength, that is, the use candidate wavelength (T1+1) succeeding, in the order according to the wavelength, the use candidate wavelength T1 randomly selected.

On the other hand, in step S56, in a case where the use candidate wavelength T1 is the maximum settable wavelength, the processing proceeds to step S58.

In step S58, the light projection adjusting section 221 sets the minimum possible value for the use candidate wavelength T1 to the blinking wavelength B1. That is, for the maximum wavelength, a one-step larger wavelength, that is, the use candidate wavelength (T1+1) succeeding the use candidate wavelength T1 in the order according to the wavelength is precluded from being set, and thus, the blinking wavelength is set equal to the minimum wavelength.

Additionally, in step S53, in a case where the use candidate wavelength T2 and the serial number S2 are not transmitted from the another vehicle, absence of another surrounding vehicle that may cause interference is assumed, and the processing proceeds to step S59.

Additionally, in step S59, the light projection adjusting section 221 sets the randomly set use candidate wavelength T1 directly as the blinking wavelength B1.

Additionally, in step S54, in a case where the use candidate wavelengths T1 and T2 are not the same, no possibility of interference is assumed, and thus the processing also proceeds to step S59. Furthermore, in step S55, in a case where the serial number S1 is not larger than the serial number S2, interference may occur. However, the another vehicle has a serial number larger than the serial number of the subject vehicle, and thus changes the wavelength. Accordingly, the subject vehicle assumes no need to change the wavelength of the subject vehicle, and the processing proceeds to step S59.

That is, in step S54, in a case where the use candidate wavelength T1 of the subject vehicle is the same as the use candidate wavelength T2 transmitted from the another vehicle, the reflector-based orientation estimation processing may involve erroneous determination caused by possible interference, and thus the processing proceeds to step S55.

Then, in step S55, whether or not the serial number S1 is larger than the serial number S2 is determined, and which of the subject vehicle and the another vehicle is to change the use candidate wavelength is determined. Note that, in this example, the case where the vehicle with the larger serial number changes the use candidate wavelength is described but the vehicle with the smaller serial number may change the use candidate wavelength or any other condition may be used to determine which of the subject vehicle and the another vehicle is to change the use candidate wavelength.

Furthermore, in a case where none of the conditions in steps S53 to S55 are satisfied, the randomly set use candidate wavelength T1 is set directly as the blinking wavelength B1.

Then, whether or not the use candidate wavelength T1 is equal to the maximum possible wavelength is determined in step S56. In a case where the use candidate wavelength T1 is not the maximum possible wavelength, in step S57, the use candidate wavelength T1 is incremented by one step to the use candidate wavelength (T1+1), which is then set as the blinking wavelength B1. That is, for the use candidate wavelength, usable wavelengths are arranged, as settable wavelengths, in order of increasing value starting with the minimum value and are correspondingly numbered. Thus, in a case where the use candidate wavelength T1 is to be changed, the use candidate wavelength T1 is changed to the use candidate wavelength (T1+1), which is one step larger than the use candidate wavelength T1 (which carries a number larger than the number of the use candidate wavelength T1 by one) and is set as the blinking wavelength B1.

Furthermore, in step S56, in a case where the use candidate wavelength T is the maximum possible wavelength, then in step S58, the minimum possible value of the use candidate wavelength T1 is set as the blinking wavelength B1. That is, the use candidate wavelength T1 is precluded from being changed by incrementing the use candidate wavelength T1 by one step, and thus the minimum value of the use candidate wavelength is set as the blinking wavelength.

The above-described processing prevents the light projecting section 222 of the another vehicle from projecting, around the subject vehicle, light with the same wavelength as that of light projected by the light projecting section 222 of the subject vehicle. This enables inhibition of erroneous determination caused by possible interference of light projected by the light projecting section 222 of the another vehicle.

As a result, in the reflector-based orientation estimation processing, misdetection can be inhibited that is caused by light with the same wavelength projected by the another vehicle, thus enabling improvement of accuracy of the reflector-based orientation estimation results.

<Image-Based Orientation Estimation Processing>

Figure 12:
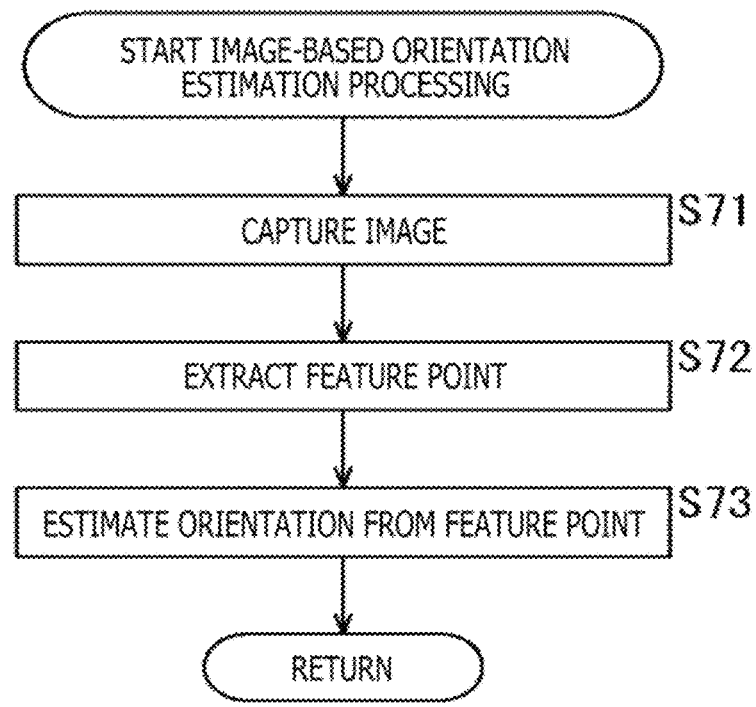
FIG. 12 is a flowchart illustrating image-based orientation estimation processing.

Now, with reference to a flowchart in FIG. 12, the image-based orientation estimation processing executed by the image-based orientation estimating section 202 will be described.

In step S71, the image acquiring section 241 captures an image of the surroundings of the vehicle 11, and outputs the captured image to the feature point extracting section 242.

In step S72, the feature point extracting section 242 extracts, for example, corner points as feature points in the captured image, and outputs the corner points to the orientation estimating section 243 as feature point information.

In step S73, the orientation estimating section 243 uses, for example, SLAM to estimate the self-orientation on a basis of the feature point information supplied by the feature point extracting section 242, and outputs the self-orientation to the estimation result integrating section 205 as image-based orientation estimation results.

The above-described processing enables the self-orientation to be estimated on a basis of images. As a result, the self-orientation is estimated on a basis of identification information regarding an object for which many such objects are included in images captured in a bright environment, thus enabling estimation accuracy to be improved.

<GPS-and-IMU-Based Orientation Estimation Processing>

Figure 13:
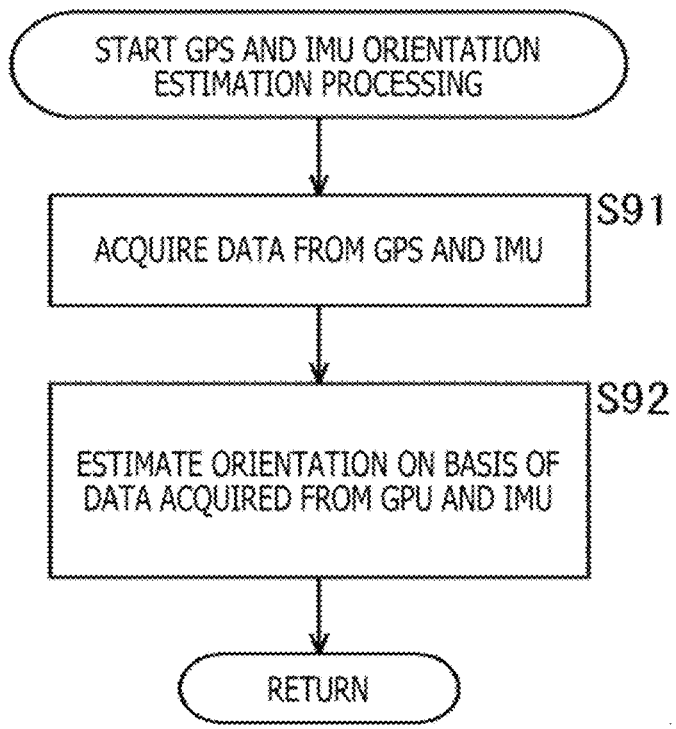
FIG. 13 is a flowchart illustrating GPS-and-IMU-based orientation estimation processing.

Now, with reference to a flowchart in FIG. 13, the GPS-and-IMU-based orientation estimation processing executed by the GPS-and-IMU-based orientation estimating section 203 will be described.

In step S91, the GPS and IMU data acquiring section 261 acquires GPS data from the GPS satellite and IMU data acquired from the inertial measurement unit such as a gyroscope, and outputs the GPS data and the IMU data to the orientation estimating section 262.

In step S92, the orientation estimating section 262 estimates the self-orientation on a basis of the GPS data from the GPS satellite and the IMU data acquired from the inertial measurement unit such as a gyroscope.

With the above-described processing, basically, the orientation is estimated on a basis of the GPS data from the GPS satellite. In an environment where no GPS data can be acquired from the GPS satellite, the orientation is estimated on a basis of the IMU data. Of course, the orientation may always be estimated by combining the orientation estimated from the GPS satellite data with the orientation estimated on a basis of the IMU data.

2. Modified Examples

The example has been described in which the reflector-based orientation estimating section 201 includes one light projecting section 222 and one light receiving section 223. However, a plurality of light projecting sections 222 and a plurality of light receiving sections 223 may be provided, and the light projecting sections 222 may project light with different wavelengths, with light projection and reception performed at different timings.

Figure 14:
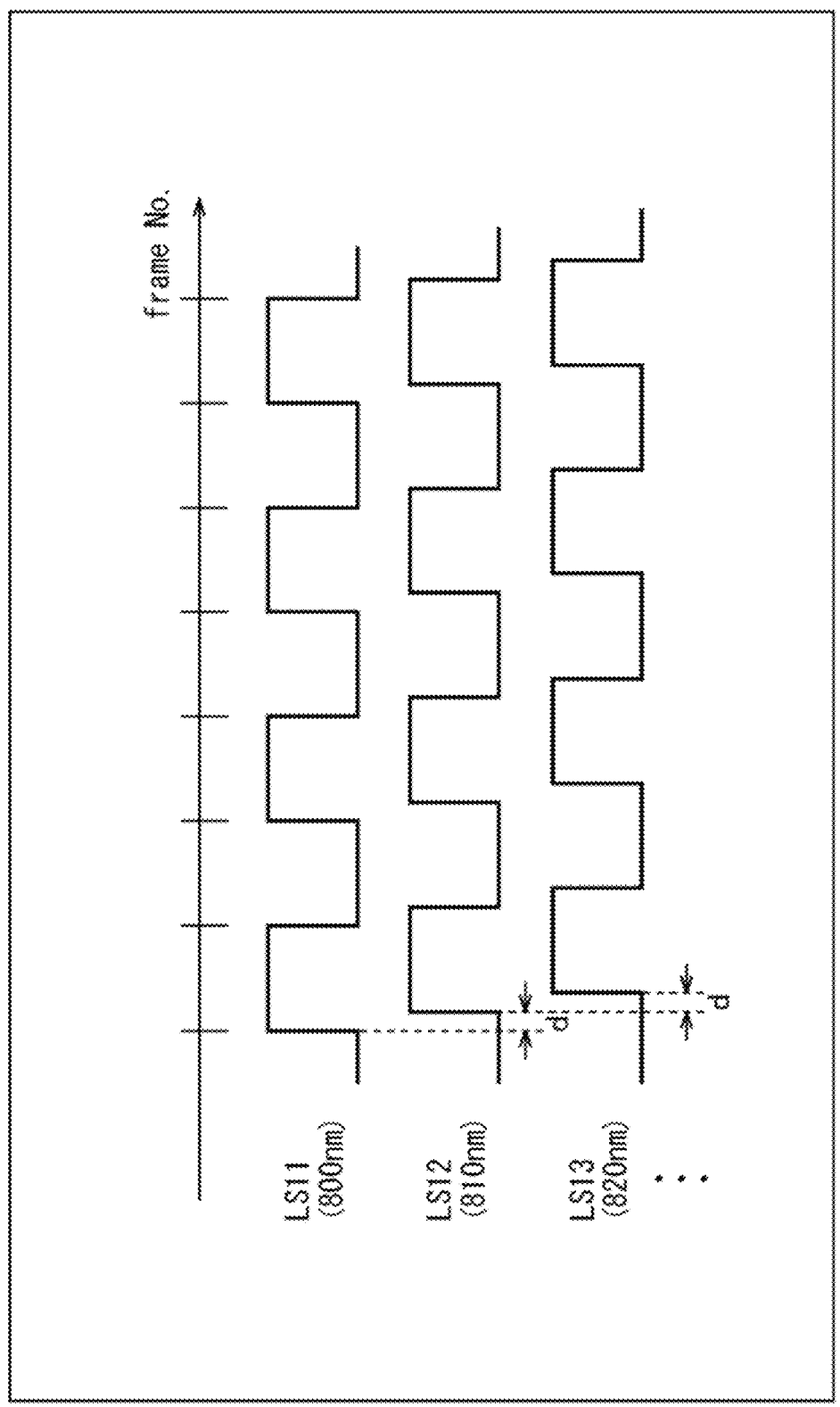
FIG. 14 is a diagram illustrating operations according to a modified example.

That is, for example, three sets of the light projecting section 222 and the light receiving section 223 are provided, and three light sources are provided that have respective types of wavelengths i.e., light LS11 with a wavelength of 800 nm, light LS12 with a wavelength of 810 nm, and light LS13 with a wavelength of 820 nm to configure three types of corresponding light receiving sections 223. In this case, for example, as illustrated in FIG. 14, light is projected at time intervals d such that light with different wavelengths is projected and received at the respective timings in the order of the light LS11 with a wavelength of 800 nm, the light LS12 with a wavelength of 810 nm, and the light LS13 with a wavelength of 820 nm. Then, reflected light from the reflectors can be identified at the time of reception. In this case, adjustment of the time intervals d enables reflected light from the reflectors to be detected even within a time shorter than period of time for one frame while identifying the reflected light as the light projected by the subject vehicle without any change in frame rate of the imaging section 311 of the light receiving section 223. That is, in FIG. 14, light can be received within a time 2d shorter than the time for one frame with the recognition that the light corresponds to the reflection, from the reflectors, of the light projected by the subject vehicle.

As a result, the reflector-based orientation estimation processing can be achieved much faster. Note that FIG. 14 is a waveform diagram illustrating timings for projection and putting-out of each of the light LS11 with a wavelength of 800 nm, the light LS12 with a wavelength of 810 nm, and the light LS13 with a wavelength of 820 nm.

3. Example of Processing Executed by Software

Incidentally, the above-described series of processing can be executed by hardware and also by software. In a case where the series of processing is executed by software, a program included in the software is installed, via a recording medium, into a computer integrated in dedicated hardware or into, for example, a general-purpose computer that can perform various functions using various programs installed in the computer.

Figure 15:
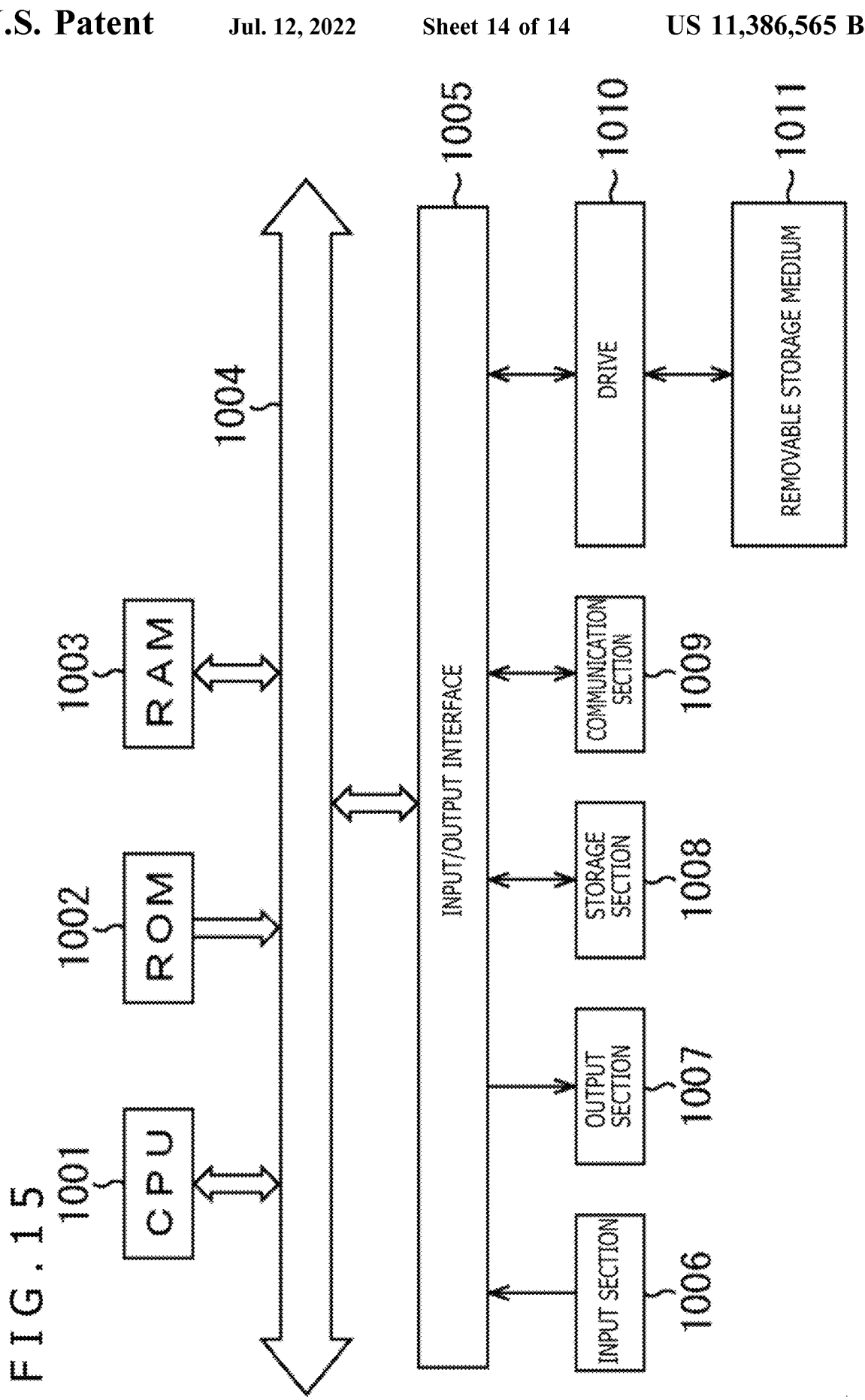
FIG. 15 is a diagram illustrating a configuration example of a general-purpose computer.

FIG. 15 illustrates a configuration example of a general-purpose computer. The computer includes a built-in CPU (Central Processing Unit) 1001. An input/output interface 1005 is connected to the CPU 1001 via a bus 1004. A ROM (Read Only Memory) 1002 and a RAM (Random Access Memory) 1003 are connected to the bus 1004.

The input/output interface 1005 connects to an input section 1006 including a keyboard and a mouse by which the user inputs operation commands, an output section 1007 outputting processing operation screens and images of processing results to a display device, a storage section 1008 including a hard disk drive in which programs and various types of data are stored, and a communication section 1009 including a LAN (Local Area Network) adapter and executing communication processing via a network represented by the Internet. The input/output interface 1005 also connects to a drive 1010 that writes and reads data to and from a removable medium 1011 such as a magnetic disk (including a flexible disk), an optical disc (including a CD-ROM (Compact Disc-Read Only Memory) and a DVD (Digital Versatile Disc)), a magneto-optical disc (including an MD (Mini Disc)), or a semiconductor memory.

The CPU 1001 executes various types of processing in accordance with programs stored in the ROM 1002 or programs read out from the removable medium 1011 such as a magnetic disk, an optical disc, a magneto-optical disc, or a semiconductor memory to be installed in the storage section 1008 and loaded into the RAM 1003 from the storage section 1008. The RAM 1003 also appropriately stores data needed for the CPU 1001 to execute various types of processing.

In the computer described above, the above-described series or processing is executed by the CPU 1001 by, for example, loading a program stored in the storage section 1008, into the RAM 1003 via the input/output interface 1005 and the bus 1004 and executing the program.

The programs executed by the computer (CPU 1001) can be, for example, provided by being recorded in the removable medium 1011 used as a package medium or the like. Alternatively, the programs can be provided via a wired or wireless transmission medium such as a local area network, the Internet, or digital satellite broadcasting.

In the computer, with the removable medium 1011 mounted in the drive 1010, the programs can be installed in the storage section 1008 via the input/output interface 1005. Additionally, the programs can be received by the communication section 1009 via a wired or wireless transmission medium and installed in the storage section 1008. Otherwise the programs can be pre-installed in the ROM 1002 or the storage section 1008.

Note that the programs executed by the computer may be configured such that processing is chronologically executed along the order described herein or executed in parallel or at necessary timings when, for example, a call is performed.

Note that the CPU 1001 in FIG. 15 implements the functions of the automatic-driving control section 112 in FIG. 1. Additionally, the storage section 1008 in FIG. 15 implements the storage section 111 in FIG. 1.

Additionally, the system as used herein means a set of a plurality of components (apparatuses, modules (parts), or the like) regardless of whether or not all the components are located in the same housing. Additionally, the following are both systems: a plurality of apparatuses housed in separate housings and connected together via the network, and one apparatus including a plurality of modules housed in one housing.

Note that the embodiments of the present disclosure are not limited to the above-described embodiments and that various changes can be made to the embodiments without departing from the spirits of the present disclosure.

For example, the present disclosure can be configured as cloud computing in which one function is shared among a plurality of apparatuses via the network and in which the apparatuses cooperate in executing processing.

Additionally, each of the steps described in the above-described flowcharts can be executed by one apparatus or shared among a plurality of apparatuses for execution.

Furthermore, in a case where one step includes a plurality of processes, the plurality of processes included in the one step can be executed by one apparatus or shared among a plurality of apparatuses for execution.

Note that the present disclosure can also be configured as follows.

<1> A signal processing apparatus including:
a light projecting section projecting light with a plurality of wavelengths; and
an object detecting section receiving reflected light of the light projected from the light projecting section, from an object having a reflectance higher than a predetermined reflectance, to detect the object.

<2> The signal processing apparatus according to <1>, further including:
a light projection adjusting section selecting one of the plurality of wavelengths of the light, causing the light projecting section to project the light with the selected wavelength, and causing the object detecting section to receive reflected light of the light with the selected wavelength to detect the object, the reflected light being obtained from the object.

<3> The signal processing apparatus according to <2>, in which
the light projecting section includes
a light source emitting light, and
a light projecting filter wheel including a plurality of filters arranged in a wheel shape to transmit light with respective predetermined wavelengths included in the light emitted by the light source, and
the light projection adjusting section adjusts the light projecting filter wheel to transmit light with the selected wavelength included in the light emitted by the light source.

<4> The signal processing apparatus according to <2>, in which
the light projecting section includes
LEDs emitting light with a plurality of wavelengths, and
the light projection adjusting section adjusts the LEDs such that at least one of the LEDs that emits the light with the selected wavelength emits the light.

<5> The signal processing apparatus according to <2>, in which
the object detecting section includes
a light receiving filter wheel including a plurality of filters arranged in a wheel shape to transmit light with respective predetermined wavelengths, and
an imaging section imaging light transmitted through one of the filters of the light receiving filter wheel, and
the light projection adjusting section adjusts the light receiving filter wheel to allow the imaging section to image the light with the selected wavelength.

<6> The signal processing apparatus according to <2>, in which
the object detecting section includes
a plurality of light receiving elements arranged in an array shape and preceded by BPFs (Band Pass Filters) transmitting light with respective predetermined wavelengths, and
the light projection adjusting section adjust the light receiving elements such that the light receiving element preceded by the BPF transmitting the light with the selected wavelength is allowed to detect the object.

<7> The signal processing apparatus according to <2>, in which
the light projection adjusting section transmits, to another signal processing apparatus, information related to a use wavelength candidate corresponding to a candidate for the wavelength used for the light projected by the light projecting section and receives information related to a use wavelength candidate for the another signal processing apparatus and transmitted by the another signal processing apparatus, and in a case where the use wavelength candidate for the signal processing apparatus in the subject vehicle matches the use wavelength candidate for the another signal processing apparatus, the light projection adjusting section causes the light projecting section to project light with a wavelength resulting from a change in the use wavelength candidate for the subject vehicle.

<8> The signal processing apparatus according to <7>, in which the light projection adjusting section transmits, to the another signal processing apparatus, an identifier of the signal processing apparatus of the subject vehicle, along with the information related to the use wavelength candidate corresponding to the candidate for the wavelength used for the light projected by the light projecting section, and receives an identifier of the another signal processing apparatus along with the information related to the use wavelength candidate for the another signal processing apparatus, and in a case where the use wavelength candidate for the signal processing apparatus of the subject vehicle matches the use wavelength candidate for the another signal processing apparatus, the light projection adjusting section causes the light projecting section to project light with a wavelength resulting from a change in the use wavelength candidate for the signal processing apparatus of the subject vehicle on a basis of a magnitude relationship between the identifier of the signal processing apparatus of the subject vehicle and the identifier of the another signal processing apparatus.

<9> The signal processing apparatus according to <8>, in which the identifiers include serial numbers.

<10> The signal processing apparatus according to <7>, in which in a case where the light projection adjusting section does not receive, from the another signal processing apparatus, information related to the use wavelength candidate for the another signal processing apparatus, the light projection adjusting section causes the light projecting section to project light with a wavelength corresponding to the use wavelength candidates for the light projecting section of the subject vehicle.

<11> The signal processing apparatus according to any one of <1> to <10>, in which the object includes a reflector, a mirror, a road sign, or a road centerline.

<12> The signal processing apparatus according to any one of <1> to <11>, in which the wavelength of the light projected by the light projecting section is in a near infrared light band.

<13> The signal processing apparatus according to any one of <1> to <12>, in which the light projecting section projects and puts out light with a plurality of wavelengths at predetermined intervals.

<14> A signal processing method including:

light projecting processing of projecting light with a plurality of wavelengths, and object detecting processing of receiving reflected light of the light projected in the light projecting process, from an object having a reflectance higher than a predetermined reflectance, to detect the object.

<15> A program causing a computer to execute processing including:

a light projecting section projecting light with a plurality of wavelengths, and an object detecting section receiving reflected light of the light projected from the light projecting section, from an object having a reflectance higher than a predetermined reflectance, to detect the object.

<16> A moving body including:

a light projecting section projecting light with a plurality of wavelengths, an object detecting section receiving reflected light of the light projected from the light projecting section, from an object having a reflectance higher than a predetermined reflectance, to detect the object, a status analyzing section analyzing a status on a basis of detection results from the status analyzing section, a scheduling section generating a behavior schedule on a basis of analysis results from the status analyzing section, and an action control section controlling an action on a basis of the behavior schedule.

REFERENCE SIGNS LIST

11 Vehicle, 102 Data acquiring section, 112 Automatic-driving control section, 141 Exterior-information detecting section, 201 Reflector-based orientation estimating section, 202 Image-based orientation estimating section, 203 GPS-and-IMU-based orientation estimating section, 204 Data acquisition status detecting section, 205 Estimation result integrating section, 221 Light projection adjusting section, 222 Light projecting section, 223 Light receiving section, 224 Reflector area extracting section, 225 Feature point extracting section, 226 Orientation estimating section, 241 Image acquiring section, 242 Feature point extracting section, 243 Orientation estimating section, 261 GPS and IMU data acquiring section, 262 Orientation estimating section, 281 Light source section, 282 Filter wheel, 291, 291$a$ to 291$d$ LED, 311 Imaging section, 312 Filter wheel, 331 Imaging element, 331$a$ to 331$h$ Light receiving element

The invention claimed is:

1. A signal processing apparatus comprising:
a light projector configured to project light with a plurality of wavelengths,
an object detector configured to receive reflected light of the light projected from the light projector, from an object having a reflectance higher than a predetermined reflectance, to detect the object; and
light projection adjusting circuitry configured to
select one of the plurality of wavelengths of the light,
cause the light projector to project the light with the selected wavelength, and
cause the object detector to receive reflected light of the light with the selected wavelength to detect the object, the reflected light being obtained from the object, wherein
the light projection adjusting circuitry is further configured to
transmit, to another signal processing apparatus, information related to a use wavelength candidate corresponding to a candidate for the wavelength used for the light projected by the light projector,
receive information related to a use wavelength candidate for the another signal processing apparatus and transmitted by the another signal processing apparatus, and
in a case where the use wavelength candidate for the signal processing apparatus in a subject vehicle matches the use wavelength candidate for the another signal processing apparatus, cause the light projector to project light with a wavelength resulting from a change in the use wavelength candidate for the subject vehicle.

2. The signal processing apparatus according to claim 1, wherein
the light projector includes
a light source emitting light, and
a light projecting filter wheel including a plurality of filters arranged in a wheel shape to transmit light with respective predetermined wavelengths included in the light emitted by the light source, and
the light projection adjusting circuitry adjusts the light projecting filter wheel to transmit light with the selected wavelength included in the light emitted by the light source.

3. The signal processing apparatus according to claim 1, wherein
the light projector includes LEDs emitting light with a plurality of wavelengths, and
the light projection adjusting circuitry adjusts the LEDs such that at least one of the LEDs that emits the light with the selected wavelength emits the light.

4. The signal processing apparatus according to claim 1, wherein
the object detector includes
a light receiving filter wheel including a plurality of filters arranged in a wheel shape to transmit light with respective predetermined wavelengths, and
an image sensor imaging light transmitted through one of the filters of the light receiving filter wheel, and
the light projection adjusting circuitry adjusts the light receiving filter wheel to allow the image sensor to image the light with the selected wavelength.

5. The signal processing apparatus according to claim 1, wherein
the object detector includes a plurality of light receiving elements arranged in an array shape and preceded by BPFs (Band Pass Filters) transmitting light with respective predetermined wavelengths, and
the light projection adjusting circuitry adjust the light receiving elements such that the light receiving element preceded by the BPF transmitting the light with the selected wavelength is allowed to detect the object.

6. The signal processing apparatus according to claim 1, wherein
the light projection adjusting circuitry is configured to:
transmit, to the another signal processing apparatus, an identifier of the signal processing apparatus of the subject vehicle, along with the information related to the use wavelength candidate corresponding to the candidate for the wavelength used for the light projected by the light projector,
receive an identifier of the another signal processing apparatus along with the information related to the use wavelength candidate for the another signal processing apparatus, and
in a case where the use wavelength candidate for the signal processing apparatus of the subject vehicle matches the use wavelength candidate for the another signal processing apparatus, cause the light projector to project light with a wavelength resulting from a change in the use wavelength candidate for the signal processing apparatus of the subject vehicle on a basis of a magnitude relationship between the identifier of the signal processing apparatus of the subject vehicle and the identifier of the another signal processing apparatus.

7. The signal processing apparatus according to claim 6, wherein
the identifiers include serial numbers.

8. The signal processing apparatus according to claim 1, wherein
in a case where the light projection adjusting circuitry does not receive, from the another signal processing apparatus, information related to the use wavelength candidate for the another signal processing apparatus, the light projection adjusting circuitry causes the light projector to project light with a wavelength corresponding to the use wavelength candidates for the light projector of the subject vehicle.

9. The signal processing apparatus according to claim 1, wherein
the object includes a reflector, a mirror, a road sign, or a road centerline.

10. The signal processing apparatus according to claim 1, wherein
the wavelength of the light projected by the light projector is in a near infrared light band.

11. The signal processing apparatus according to claim 1, wherein
the light projector projects and puts out light with a plurality of wavelengths at predetermined intervals.

12. A signal processing method comprising:
projecting, using a light projector, light with a plurality of wavelengths;
receiving, using an object detector, reflected light of the projected light, from an object having a reflectance higher than a predetermined reflectance, to detect the object;
selecting, using light projection adjusting circuitry, one of the plurality of wavelengths of the light;
causing, using the light projection adjusting circuitry, the light projector to project the light with the selected wavelength;
causing, using the light projection adjusting circuitry, the object detector to receive reflected light of the light with the selected wavelength to detect the object, the reflected light being obtained from the object;
transmitting, using the light projection adjusting circuitry, to another signal processing apparatus, information related to a use wavelength candidate corresponding to a candidate for the wavelength used for the light projected by the light projector;
receiving, using the light projection adjusting circuitry, information related to a use wavelength candidate for the another signal processing apparatus and transmitted by the another signal processing apparatus; and
in a case where the use wavelength candidate for the signal processing apparatus in a subject vehicle matches the use wavelength candidate for the another signal processing apparatus, causing, using the light projection adjusting circuitry, the light projector to project light with a wavelength resulting from a change in the use wavelength candidate for the subject vehicle.

13. A non-transitory computer readable medium including executable instructions, which when executed by a computer cause the computer to execute a signal processing method, the method comprising:
projecting, using a light projector, light with a plurality of wavelengths;

receiving, using an object detector, reflected light of the projected light, from an object having a reflectance higher than a predetermined reflectance, to detect the object;

selecting one of the plurality of wavelengths of the light;

causing the light projector to project the light with the selected wavelength;

causing the object detector to receive reflected light of the light with the selected wavelength to detect the object, the reflected light being obtained from the object;

transmitting to another signal processing apparatus, information related to a use wavelength candidate corresponding to a candidate for the wavelength used for the light projected by the light projector;

receiving information related to a use wavelength candidate for the another signal processing apparatus and transmitted by the another signal processing apparatus; and in a case where the use wavelength candidate for the signal processing apparatus in a subject vehicle matches the use wavelength candidate for the another signal processing apparatus, causing the light projector to project light with a wavelength resulting from a change in the use wavelength candidate for the subject vehicle.

14. A moving body comprising:

a light projector configured to project light with a plurality of wavelengths;

an object detector configured to receive reflected light of the light projected from the light projector, from an object having a reflectance higher than a predetermined reflectance, to detect the object;

light projection adjusting circuitry configured to
select one of the plurality of wavelengths of the light,
cause the light projector to project the light with the selected wavelength, and
cause the object detector to receive reflected light of the light with the selected wavelength to detect the object, the reflected light being obtained from the object, status analyzing circuitry configured to analyze a status on a basis of detection results from the object detector;

scheduling circuitry configured to generate a behavior schedule on a basis of analysis results from the status analyzing circuitry; and action control circuitry configured to control an action on a basis of the behavior schedule, wherein the light projection adjusting circuitry is further configured to
transmit, to another signal processing apparatus, information related to a use wavelength candidate corresponding to a candidate for the wavelength used for the light projected by the light projector,
receive information related to a use wavelength candidate for the another signal processing apparatus and transmitted by the another signal processing apparatus, and
in a case where the use wavelength candidate for the signal processing apparatus in a subject vehicle matches the use wavelength candidate for the another signal processing apparatus, cause the light projector to project light with a wavelength resulting from a change in the use wavelength candidate for the subject vehicle.

* * * * *